US008642507B1

(12) United States Patent
Entry et al.

(10) Patent No.: US 8,642,507 B1
(45) Date of Patent: Feb. 4, 2014

(54) FERTILIZER FORMULATION FOR REDUCTION OF NUTRIENT AND PESTICIDE LEACHING

(75) Inventors: James A. Entry, Dania Beach, FL (US); Robert E. Sojka, Twin Falls, ID (US)

(73) Assignee: The United States of America as represented by the Secretary of Agriculture, Washington, DC (US)

( * ) Notice: Subject to any disclaimer, the term of this patent is extended or adjusted under 35 U.S.C. 154(b) by 1956 days.

(21) Appl. No.: 11/504,401

(22) Filed: Aug. 14, 2006

(51) Int. Cl.
*A01N 59/00* (2006.01)
*A01N 59/06* (2006.01)

(52) U.S. Cl.
USPC ............ 504/101; 504/126; 504/187; 504/188

(58) Field of Classification Search
USPC .................. 504/101, 126, 187, 188
See application file for complete search history.

(56) References Cited

U.S. PATENT DOCUMENTS

| | | | | | |
|---|---|---|---|---|---|
| 4,199,496 | A | * | 4/1980 | Peniston et al. | 530/400 |
| 4,382,813 | A | * | 5/1983 | Shasha | 504/220 |
| 4,911,952 | A | * | 3/1990 | Doane et al. | 427/213.31 |
| 5,565,407 | A | * | 10/1996 | Southard | 504/360 |
| 5,676,726 | A | * | 10/1997 | Aoki et al. | 71/6 |
| 6,858,634 | B2 | | 2/2005 | Asrar et al. | |
| 6,864,245 | B2 | | 3/2005 | Vournakis et al. | |
| 6,900,162 | B2 | | 5/2005 | Wertz et al. | |
| 7,018,441 | B2 | | 3/2006 | Tabei | |
| 2004/0038031 | A1 | * | 2/2004 | Holbrey et al. | 428/402.24 |

FOREIGN PATENT DOCUMENTS

| | | | |
|---|---|---|---|
| JP | 06-144975 A | * | 5/1994 |
| RO | 80426 A | * | 11/1982 |

OTHER PUBLICATIONS

A. Shaviv and R.L. Mikkelsen, "Controlled-release fertilizers to increase efficiency of nutrient use and minimize environmental degradation—A review", Fertilizer Research 35: 1-12, 1993.*

Otey, F., Trimnell, D., Westhoff, R. and Shasha, B., "Starch Matrix for Controlled Release of Urea Fertilizer", Journal of Agricultural & Food Chemistry, 1984, pp. 1095-1098.*
Cotterill, J. and Wilkins, R., "Controlled Release of Phenylurea Herbicides from a Lignin Matrix: Release Kinetics and Modification with Urea", 1996, 44, pp. 2908-2912.*
Wang, D., Peng, J. and Liao, Z, "Effect of modified lignin slow-releasing function on potassium fertilizer and potassium uptake by crops", Plant Nutrition and Fertilizing Science, 2003, Abstract.*
Zhang, Z., Mu, H., Huang, Y. and Liu, C., Application of Lignin and Its Modified Analogs in Environment Protection, Journal of Agro-Environmental Science, 2006, S1, Abstract.*
Zhu, A., Wang, D., Liao, Z. and You, Z., "Fertilizer Efficiency of Ammonia-oxidized Lignin (AOL) a Modified Lignin from Wastewater in Paper-Making Used as a Slow-Released Nitrogen Fertilizer", Agro-environmental Protection, 2001, Abstract.*
Moore, P., Daniel, T. And Edwards, D., "Reducing Phosphorus Runoff and Inhibiting Ammonia Loss from Poultry Manure with Aluminum Sulfate", Journal of Environmental Quality, 2000, 29(1), pp. 37-49.*
Lewis, N., Davin, L. and Sarkanen, S., "Lignin and Lignan Biosynthesis: Distinctions and Reconciliations", ACS Symposium Series, Lignin and Lignan Biosynthesis, Aug. 13, 1998, vol. 697, pp. 1-27.*
Richard M. Wilkins, "Lignins as Formulating Agents for Controlled Release in Agriculture", British Polymer Journal, 1983, vol. 15, 177-178.*
Machine generated English-language translation of JP 06-144975 A.*
Blaylock, A.D., J. Kaufmann, and R.D. Dowbenko "Nitrogen Fertilizer Technologies" Western Nutrient Management Conference, Salt Lake City UT (2005) 6:8-13.

* cited by examiner

*Primary Examiner* — James H Alstrum Acevedo
(74) *Attorney, Agent, or Firm* — Elizabeth R. Sampson; John D. Fado; Lesley Shaw

(57) ABSTRACT

In one aspect the invention provides matrix based fertilizer formulations that reduce plant nutrient leaching into water sources. In another aspect, the invention provides matrix based formulations that reduce pesticide leaching into water sources. In still another aspect the invention provides matrix based fertilizer formulations comprising both fertilizers and pesticides wherein the formulation reduces pesticide and plant nutrient leaching into water sources. The invention also provides methods for the application of matrix based fertilizer formulations.

8 Claims, No Drawings

FERTILIZER FORMULATION FOR REDUCTION OF NUTRIENT AND PESTICIDE LEACHING

BACKGROUND OF THE INVENTION

The leaching of contaminants from human crop fields, lawns, gardens and parks is a major cause of water resource contamination and pollution. Contaminants of particular concern include, but are not limited to fertilizers, pesticides and pathogenic microorganisms that can leach into water sources e.g., groundwater, rivers, lakes, streams, and estuaries.

Despite the beneficial effects on cultivated plants, when fertilizer nutrients such as nitrogen, potassium, and phosphorus end up in the larger environment, the result is contamination and often eutrophication of water sources e.g., lakes, rivers, streams and estuaries.

Unfortunately, the problem of eutrophication is extensive. Indeed, eutrophication accounts for nearly one half of impaired lake areas in the U.S., and an even greater portion of impaired rivers. Eutrophication is rapidly expanding not only in lakes and rivers, but also in estuaries and coastal seas of the developed world. Thus, fertilizer nutrient runoff leads to eutrophication and upsets the ecological balance. The ecological imbalance can have dangerous consequences, the full extent of which is still unknown.

Pesticide contamination of water resources is also problematic. Insecticides, herbicides, and fungicides which are used to kill agricultural pests, enter the water system and contaminate water resources through both direct application, and runoff. Contaminating pesticides poison fish and wildlife, contaminate food sources, and destroy animal habitat. Furthermore, many pesticides are toxic to human beings, and thus their presence in water supplies poses a significant human health threat.

Unfortunately, agriculture is one of the largest contributors of fertilizer and pesticide pollution. Indeed, agricultural pollution is a major source of water quality impacts to rivers and lakes, the third largest source of impairments to estuaries, and is also a major contributor to groundwater contamination and wetlands degradation. However, agriculture is not the sole contributor to the problem of fertilizer and pesticide contamination of water resources. Indeed, runoff from the maintenance and beautification of parks, lawns, golf courses and gardens are also significant contributors to nonpoint source pollution of water resources.

Currently, the United States has over 330 million acres of agricultural land, between about 14 and 26 million acres of lawn, and between about 2 million to about 3 million acres of golf courses distributed over about 15,827 facilities. The runoff pollution generated from just these sources is significant, and is damaging enough to warrant measures for the reduction of runoff pollution. Indeed, as more native lands are converted for agricultural, recreational, housing and other human development purposes, further increases to nonpoint source pollution of water resources are expected. If these sources of pollution are not controlled, extreme environmental degradation will inevitably result.

Clearly, what is needed are fertilizer and pesticide formulations and methods of their application that reduce or eliminate nonpoint source pollution while maintaining the quality and abundance of American agriculture and the beauty of American home landscapes, recreational facilities and public parks.

Current fertilizer technology consists primarily of direct application and/or slow release fertilizers e.g., Osmocote®, ESN®, Polyon®, and Avail®, to name a few. Unfortunately, slow release fertilizers are designed either to delay release of fertilizer components by holding nutrients in place and then releasing them all at once at some time after the application e.g., by using a water soluble membrane (see e.g., U.S. Pat. No. 6,858,634 U.S. Pat. No. 6,864,245; U.S. Pat. No. 6,900,162; and U.S. Pat. No. 7,018,441). Or in the case of low solubility slow release fertilizers, the composition must rely on natural processes e.g., soil pH, soil temperature, rainfall, etc., to release the fertilizer. Since the majority of nutrients still enter the environment in a short interval of time, the excess that typically results in run-off is still created.

Similarly, current pesticide application methods do little to ensure that the pesticide remains in the place where it is applied. For example, soil insecticides and nematicides are typically either incorporated in the soil, surface applied, and/or applied over-the-top of foliage. Clearly losses will occur in the first few rainfall events after application. Not surprisingly, the situation of environmental pesticide contamination is made more egregious by pesticides that persist longer in the environment, since such long lasting pesticidal chemicals are exposed to more leaching and runoff events.

Thus, the same fertilizers and pesticides that ensure abundant agricultural harvests and attractive yards, parks and recreational facilities are also problematic in that they contribute significantly to the degradation of water supplies through run-off and leaching which produces pollution and eutrophication. Therefore, fertilizer and pesticide formulations and methods of application that minimize pollution while simultaneously preserving the benefits of fertilizers and pesticides are clearly needed in the art. Fortunately, the invention disclosed herein meets these and other needs.

SUMMARY OF THE INVENTION

Environmentally friendly and effective methods for minimizing nonpoint source pollution of water resources have now been discovered. These methods preserve the benefits of agricultural and non-agricultural uses of fertilizers and pesticides while reducing the pollution that is currently associated with the use of fertilizers and pesticides.

In one aspect, the invention provides a matrix based fertilizer formulation comprising: at least one metal compound; and a high ionic exchange matrix comprising at least one of chitosan, lignin, cellulose and starch. In an exemplary embodiment, the matrix based fertilizer formulation comprises a metal compound selected from the group consisting of aluminum compounds and iron compounds or a combination of such members. In another exemplary embodiment, the matrix based fertilizer formulation comprises an aluminum compound selected from the group consisting of hydrated aluminum sulfate, and aluminum hydroxide or a combination of such members; and an iron compound selected from the group consisting of ferric sulfate, and ferric citrate or a combination of such members. In another exemplary embodiment, the matrix based fertilizer formulation further comprises plant nutrients. In another exemplary embodiment, the plant nutrients are members selected from the group consisting of nitrogen, phosphorus, potassium, calcium, magnesium, manganese, iron, copper, molybdenum, boron, silicon, chlorine, zinc animal or human waste, or a combination of such members.

In another aspect, the invention provides a method of minimizing plant nutrient leaching into water sources using a matrix based fertilizer formulation comprising: at least one metal compound; and a high ionic exchange matrix comprising at least one of chitosan, lignin, cellulose and starch, the method comprising: (a) applying the at least one metal compound to soil; (b) mixing plant nutrients with the high ionic exchange matrix thereby forming a mixture comprising plant nutrients and a high ionic exchange matrix; and (c) layering mixture from step (b) over the at least one metal compound from step (a).

In another aspect, the invention provides a method of minimizing plant nutrient leaching into water sources using a matrix based fertilizer formulation comprising: at least one metal compound; and a high ionic exchange matrix comprising at least one of chitosan, lignin, cellulose and starch, the method comprising: (a) mixing the plant nutrients, and the at least one metal compound with the high ionic exchange matrix thereby forming a mixture comprising plant nutrients and a high ionic exchange matrix; and (b) applying the mixture to soil.

In still another aspect, the invention provides a method of method of minimizing pesticide leaching into water sources the method comprising: (a) mixing at least one pesticide with a high ionic exchange matrix comprising at least one of chitosan, lignin, cellulose and starch, thereby forming a mixture comprising a pesticide and a high ionic exchange matrix; and (b) applying the mixture to soil. In an exemplary embodiment, the mixture comprising a pesticide and a high ionic exchange matrix further comprises at least one metal compound; and the applying step comprises directly applying the mixture to soil. In an exemplary embodiment, the applying step comprises: (i) applying at least one metal compound to soil; and (ii) layering the mixture comprising the at least one pesticide and high ionic exchange matrix over the at least one metal compound. In still another exemplary embodiment, the mixture comprising a pesticide and a high ionic exchange matrix further comprises plant nutrients.

In still another aspect, the invention provides a matrix based fertilizer formulation comprising plant nutrients, and chitosan; lignin; starch; hydrated aluminum sulfate; and ferric sulfate. In an exemplary embodiment, the chitosan is present in an amount of about 20% weight/weight; the lignin is present in an amount of about 20% weight/weight; the starch is present in an amount of about 20% weight/weight; and the hydrated aluminum sulfate is present in an amount between about 0.01% weight/weight to about 5.0% weight/weight; and the ferric sulfate is present in an amount between about 4.0% weight/weight to about 15.5% weight/weight.

Other aspects, objects and advantages of the present invention will be apparent from the detailed description that follows.

DETAILED DESCRIPTION OF THE INVENTION

Definitions

The term "non-point source pollution" or "NPS pollution" refers to pollution that comes from many ill-defined and diffuse sources. Nonpoint sources are typically difficult to regulate and usually vary spatially and temporally (e.g., with season, precipitation, and other irregular events). General human presence brings with it a variety of nonpoint sources. For example, nitrogen and phosphorus transport is correlated with various indices of human activity e.g., agriculture and development.

In an exemplary embodiment, NPS pollution is paused by stormwater, rainfall or snowmelt moving over and through the ground. As the runoff moves, it picks up and carries away natural and human-made pollutants, depositing the pollutants into lakes, rivers, wetlands, coastal waters, and even underground sources of drinking water. NPS pollutants include, but are not limited to: excess fertilizers, pesticides e.g., herbicides, and insecticides, from agricultural lands and residential areas; oil, grease, and toxic chemicals from urban runoff and energy production; sediment from improperly managed construction sites, crop and forest lands, and eroding stream banks; salt from irrigation practices and acid drainage from abandoned mines; bacteria and nutrients from livestock, human and pet wastes, and faulty septic systems; plant pathogens and atmospheric deposition and hydromodification are just a few sources of nonpoint source pollution.

As noted above, pollutants including, but not limited to NPS pollutants, released and picked up in e.g., rainfall, stormwater, snowmelt or other water sources, can eventually find their way into groundwater making the groundwater unsafe to use.

The term "groundwater" as used herein refers to water beneath the surface of the ground. Groundwater is a long-term reservoir of the natural water cycle. The water cycle is influenced by processes of recharge and discharge which are affected by both natural and artificial causes. For example, groundwater is naturally replenished by surface water e.g., from precipitation, stormwater, streams, lakes and rivers. Replenishment also occurs as a result of human uses e.g., irrigation of agriculural lands, watering of parks and gardens, for example. Natural discharge occurs e.g., at springs and seeps, oases and/or wetlands. Artificial discharge occurs when e.g., groundwater is withdrawn for agricultural, municipal and industrial use by constructing and operating extraction wells.

Although groundwater is typically thought of as liquid water flowing through aquifers, groundwater also includes soil moisture, permafrost (frozen soil), immobile water in very low permeability bedrock, and/or deep geothermal or oil formation water.

In addition to groundwater, there are other "water sources" that sustain human activity as well as other life on the planet. The term "water sources" as used herein refers to all sources of water on the earth. These sources include, but are not limited to groundwater and sources of surface freshwater such as e.g., rain, snow, rivers, lakes, streams, ponds, estuaries, oceans, bays, icecaps and glaciers.

The term "agriculture" as used herein, refers broadly to human cultivation of plants. Thus, "agriculture" as used herein, encompasses all aspects of plant cultivation including but not limited to the science, art and/or occupation of plant cultivation and crop production. In an exemplary embodiment, "agriculture" refers to e.g., backyard gardening, lawn care, maintenance of golf courses, maintenance of parklands, etc. In another exemplary embodiment, "agriculture" refers to e.g., small, medium and/or large scale farming as well as commercial scale agricultural production.

The term "nutrient" as used herein, refers to a substance or matter that when taken into a living organism serves to sustain the organism in its existence, by promoting growth, replacing loss, and providing energy. Nutrients can be taken into an organism by whatever means that an organism typically uses to take in nutrients e.g., plants typically absorb nutrients through their roots and leaves. Thus, in an exemplary embodiment, "nutrients" are "plant nutrients".

With respect to cultivated plants, nutrient content of the soil and air is enhanced by the application of a "fertilizer" to the leaves of the plant and/or to the substrate in which the plant has laid down roots, e.g., soil. Fertilizers can be organic (composed of organic matter, i.e. carbon based), or inorganic (containing simple, inorganic chemicals). They can be naturally-occurring compounds such as peat or mineral deposits, or manufactured through natural processes (such as composting) or chemical processes (e.g., the Haber-Bosch process).

Fertilizers typically provide, in varying proportions, one or more of the following: one or more of the three major "plant nutrients" (e.g., nitrogen, phosphorus, and potassium), one or more of the secondary "plant nutrients" (e.g., calcium, sulfur, magnesium), and/or one or more of the trace elements or "plant micronutrients" e.g., boron, manganese, iron, zinc, copper and molybdenum.

Thus, the term "fertilizer" as used herein, refers to any substance which, when applied to a substrate, e.g., soil, leaves, hydroponic solution etc., enriches or fertilizes that substrate by providing nutrients for the organism's, e.g., plant's, necessary biological functions, e.g., growth, flowering etc. In an exemplary embodiment, a fertilizer comprises plant nutrients in the form of agricultural waste products, e.g., manure, grass clippings, compost. In another exemplary embodiment, a fertilizer comprises a synthetic blend of various chemical substances known in the art as plant nutrients, e.g., blends comprising at least one or more of nitrogen, potassium, and/or phosphorus. In still other exemplary embodiments, a "fertilizer" comprises a combination of agricultural waste products and synthetic chemicals which, when applied to a substrate enriches or fertilizes that substrate.

Thus, the phrase "fertilizer formulation" as used herein, refers to any mixture of plant nutrients in a particular combination with each other and/or in a particular combination with various other fertilizer components, additives and fillers. Useful fertilizer components for a fertilizer formulation include, but are not limited to any one or more of such chemicals metal sulfates and/or biopolymers e.g., chitosan, lignin, starch and/or cellulose. Useful additive include, but are not limited to e.g., pesticides.

The phrase "slow release fertilizer" as used herein, refers to non-matrix based fertilizer formulations that are designed to release their components at some time after fertilizer application. Some exemplary "slow release fertilizers" are encapsulated within a coating which slowly dissolves, releasing the fertilizer e.g., Osmocote®, ESN®, Polyon®, Avail®. Commercial slow release fertilizers can be classified into two basic groups: low solubility and polymer coated water soluble fertilizers (Blaylock et al., (2005), *Western Nutr Manage. Coq:* 6:8-13).

Low solubility slow release fertilizers typically work by relying on natural processes other to release the fertilizer. For example, methylene ureas which function as sources of nitrogen, are typically released by either hydrolysis or by microbial activity in the soil. Both hydrolysis and microbial activity thus control the rate of how fast the nitrogen is available to the soil. Other slowly soluble forms include e.g., sulfur coated urea and plastic resin coated fertilizers.

Polymer coated slow release fertilizers delay release of fertilizer components by holding nutrients in place and releasing them slowly through a semipermeable membrane until such time as the membrane dissolves at some time after the application. When the membrane dissolves, the remaining nutrients are released all at once.

The term "pesticide" as used herein, refers to any substance or mixture of substances intended for preventing, destroying, repelling, or mitigating any pest. A pesticide may be a chemical substance or biological agent (e.g., a virus or bacteria) used against pests including, but not limited to arthropods, insects, plant pathogens, weeds, mollusks, birds, mammals, fish, nematodes (e.g., roundworms), protozoa, fungi, bacteria and/or microbes that compete with humans for food, destroy property, spread disease or are a nuisance. Pesticides are usually, but not always, poisonous to humans.

Exemplary pesticides include herbicides. Herbicides are used to kill unwanted plants e.g., Imazapyr, Imazapic, clopyralid, and the like. In some embodiments the herbicide is a selective herbicide which kills certain targets while leaving the desired crop relatively unharmed. An exemplary herbicide is 2,4-dichlorophenoxyacetic acid (2,4-D) which kills many broadleaf plants while leaving grasses largely unaffected. Another exemplary herbicide is Glyphosate, also known as Roundup, which is used in selective weed control.

Other exemplary pesticides include fungicides which are chemical compounds used to prevent the spread of fungi in gardens and crops. Fungicides are also used to fight fungal infections. Other exemplary pesticides include, but are not limited to miticides, larvicides, avicides, insecticides, nematicides, and rodenticides, to name a few.

The phrase "metal compound" as used herein, refers to a chemical compound that comprises a metal cation. Exemplary metal compounds include, but are not limited to hydrated aluminum sulfate, aluminum hydrxide, ferric citrate, ferric sulfate, cupric sulfate.

The term "nitrogen source" as used herein, refers to any chemical compound which comprises inorganic nitrogen. As is known in the art, inorganic nitrogen may exist in the free state as a gas $N_2$, or as nitrate $NO_3^-$, nitrite $NO_2^-$, ammonia $NH_3$, and/or ammonium $NH_4^+$.

In an exemplary embodiment, "nitrogen sources" are the salts of nitric acid. In another exemplary embodiment, "nitrogen sources" are nitrates. Some exemplary nitrates include, but are not limited to potassium nitrate (saltpeter), ammonium nitrate, hydrated calcium nitrate, hydrated aluminum nitrate. In another exemplary embodiment, "nitrogen sources" are ammonium compounds e.g., ammonium phosphate, ammonium hydroxide, or ammonium chloride.

The term "phosphates" as used herein, refers to any soluble chemical compound comprising a phosphate group. As is known in the art, phosphate groups typically comprise one phosphorus atom and four oxygen atoms. For example, chemical compounds comprising the phosphate group include the phosphate ion, $PO_4^{3-}$; the hydrogen phosphate ion, $HPO_4^{2-}$; the dihydrogen phosphate ion, $H_2PO_4^-$; and phosphoric acid, $H_3PO_4$. Exemplary phosphates include, but are not limited to ammonium phosphate, calcium phosphate, ferric phosphate, and aluminum phosphate.

The phrase "high ionic exchange matrix" as used herein, refers to a composition comprising ion exchange substances that are capable of both cation and anion exchange. The "high ion exchange matrix is ionized across a wide pH range thus, it is a "strong" ion exchanger. Without being bound by theory, it is believed that the high ionic exchange matrix first adsorbs cations and anions, and then releases the adsorbed ions in a controlled manner, over a period of time. Cations and anions are also released through degradation of the matrix itself.

In an exemplary embodiment, the "high ionic exchange matrix" comprises a mixture of semi-soluble and/or decomposable polymers. In another exemplary embodiment, the "high ionic exchange matrix" comprises at least one or more of the following: chitosan, lignin, cellulose and/or starch. In another embodiment, the semi-soluble or decomposable polymers comprising the "high ionic exchange matrix" are chitosan, starch, lignin and/or cellulose.

The phrase "semi-soluble polymer" or "decomposable polymer" as used herein, refers to polymeric compounds that degrade in their environment over time. "Semi-soluble" or "decomposable" polymers include, but are not limited to e.g., polyacrylamide, chitosan, lignin, cellulose and/or starch.

The term "chitosan" as used herein, refers to a linear polysaccharide composed of randomly distributed β-(1-4)- linked D-glucosamine (deacetylated unit) and N-acetyl-D-glucosamine. Chitosan is an exemplary semi-soluble or decomposable polymer.

As is well known in the art, chitosan can be isolated by deacetylation of chitin (see e.g., Khor, et al. Biomaterials (2003) 24:2339-49; Bough W. A, Poultry Sci. (1975) 54:1940; and/or Masri M. S, Reuter F. W and Friedman M, J. Appl. Polymer Sci., (1974) 18:675). One exemplary source of chitin is crustacean skeletons (prawn, shrimps, krill and crabs). Thus, chitin is inexpensively obtained as a waste product of the seafood industry. Of course, any chitin containing compound e.g., mushrooms, can serve as a source of chitin, and therefore, ultimately, chitosan. For example, chitin can be found in nature as a component of the cell walls of fungi and can be isolated from such sources (see e.g., U.S. Pat. No. 6,972,284).

Typically, an isolated chitosan polymer is deacetylated to a degree sufficient to make the resulting molecule soluble in weak acids. Insolubility in such substances indicates the presence of chitin (*Chitin Handbook*, European Chitin Society, R. A. A. Muzzarelli, and M. G. Peter, eds. Atec Edizioni, Grottammare, Italy, 1997).

The term "lignin" as used herein, refers to a plant phenolic biopolymer (see e.g., Goujon, et al. Plant Physiology and Biochemistry 41:677-87 (2003)) having a structure comprising p-hydroxycinammyl alcohol precursors, p-coumaryl, coniferyl and sinapyl alcohols. In an exemplary embodiment, lignin is isolated from the xylem of plants e.g., land plants (see e.g., Donaldson, Phytochemistry 57:859-73 (2001)) where it occurs as a major noncarbohydrate constituent. Thus, in an exemplary embodiment, lignin is available as an inexpensive waste product of the lumber industry. Lignin is another exemplary semi-soluble or decomposable polymer.

The term "starch" as used herein, refers to a carbohydrate compound having the formula $(C_6H_{10}O_5)_n$, where "n" denotes the total number of glucose monomer units. Starch is another exemplary semi-soluble or decomposable polymer which can be isolated by methods known in the art (Jobling (2004), Current Opinion in Plant Biology 7:210) from a variety of plant sources.

Typically, starches are comprised of the polysaccharides, namely amylose and amylopectin. The amylose polysaccharide is comprised primarily of glucose monomer units joined to one another in $\alpha$-1,4 linkages. Amylose is typically considered a linear molecule, however some minor branching sometimes is found. Typically, amylose polymers range in length from between about 500 to about 20,000 glucose monomer units, although any length is possible. Amylopectin is also comprised of glucose monomer units, but is not usually considered by those of skill in the art to be a strictly linear molecule. Instead, the amylopectin polysaccharide formed through $\alpha$-1,4 linked glucose monomers is interspersed at intervals of about every 24-30 glucose monomer units with branches that are formed by glucose monomers in $\alpha$-1,6 linkage.

The relative content of amylose and amylopectin in starch can vary. Typically, amylose comprises about 20% to about 25% to about 30% of the starch, but may be present in higher concentrations as well. For example "high-amylose corn starch" (HACS) comprises at least about 40% amylose, and in some embodiments comprises about 50%, about 60%, about 70% amylose, and in other embodiments comprises about 80% amylose or about 85% amylose. Amylopectin on the other hand, typically comprises about 70% to about 75%, to about 80% of the starch, but may occur in higher proportions or lower proportions as well, e.g., waxy corn starch may comprise more than 99% amylopectin, and HACS may comprise as little as 15% amylopectin or less.

Starch is often found in the fruit, seeds, stems, rhizomes and/or tubers of plants. Thus many starches are plant derived starches or "plant starch". Typically, starch produced in the USA is derived from corn, potatoes, rice, and wheat. However, useful starches can come from any source e.g., seeweed, arrowroot, guar gum, locust bean, tapioca, arracacha, buckwheat, banana, barley, cassava, konjac, kudzu, oca, sago, sorghum, sweet potato, taro, yams and beans e.g., favas, lentils and peas.

The term "starch" as used herein, can also refer to "modified starch" which has been modified by human intervention such that it differs from the raw, unmodified form as extracted from a plant. For example, starch can be modified by methods known in the art such as e.g., by chemical crosslinking and/or by stabilization through the introduction of anionic groups to the starch granule.

The term "cellulose" as used herein refers to a linear polymer of $\beta$-D-glucopyranose units. Cellulose monomers (O-glucose) are linked together through $\beta1 \rightarrow 4$ glycosidic bonds to form a straight chain polymer. Cellulose is an exemplary semi-soluble or decomposable polymer.

The term "mycorrhizal fungus" as used herein, refers to a fungus that forms a symbiotic mycorrhizal relationship with a plant by way of the plant roots. Mycorrhizas are associations between fungi and plant roots that are typically beneficial to both the plant and the fungi. Within the mycorrhizal relationship, the fungus receives carbohydrates as energy from the host plant whilst nutrients e.g., phosphorus and zinc, are passed from the soil through the fungus back to the plant. Thus, the fungus facilitates nutrient exchange between the plant and the soil, and is benefited itself in that it receives carbohydrate energy from the plant.

There are four main kinds of mycorrhizal fungi: arbuscular, ectomycorrhizal, ericoid and orchid mycorrhizal. Most agricultural plants, vegetables and orchard plants form arbuscular mycorrhizal associations. The name arbuscular mycorrhiza comes from the structure that characterizes the symbiotic associations; i.e., a finely branched intracellular hyphae (haustoria) that is called an "arbuscule." It is in the "arbuscule" where the metabolic exchanges between the fungus and the host plant take place. Thus, an arbuscular mycorrhizal fungus is any mycorrhizal fungus that produces "arbuscules" in symbiosis with its host plant species.

Arbuscular Mycorrhiza are classified in the Order Glomales and in two suborders: Glomineae with vesicles in the roots and formation of asexual spores (Chlamydospores) and the Order Gigasporineae with absence of vesicles in the roots and formation of auxiliary cells and azygospores (see e.g., Morton and Benny (1990) Mycotaxon 37:471). The suborder Glomineae is divided into two families: Glomaceae comprising the genus *Glomus* and *Sclerocystis*, and Acaulosporaceae comprising the genus *Acaulospora* and *Entrophosphora*. Each genus is comprised of numerous species, e.g., the genus *Glomus* comprises the species *Glomus interadices*.

The phrase "arbuscular mycorrhizal fungal spores" as used herein, refers to a small, usually single-celled reproductive body produced by an arbuscular mycorrhizal fungus, which is capable of growing into a new organism. Spores are typically haploid, and are highly resistant to desiccation and heat.

The term "leaching" as used herein refers to the removal of nutrients from soil by dissolution away from solids into the waterphase e.g., the removal or loss of nutrients from the soil into the water table. Leaching is influenced by numerous factors including, but not limited to the nature of the material subject to leaching; water flow through the area of leaching due to e.g., rainfall irrigation etc; pH; redox; dissolved organic matter and (micro)biological activity.

The phrase "leaching into groundwater" refers to the process of liquid or dissolved chemicals moving from above ground to below ground. In an exemplary embodiment dissolved chemicals "leach into groundwater" when they move from above the water table to below the water table into the groundwater. The water table is the upper limit of abundant groundwater where the interstices between particles of earth are saturated with water, as opposed to the area above the water table where the interstices between particles of earth are filled by air. Rivers, lakes, and wells are typically the result of earth falling below the water table. Therefore, the measurement of leaching into groundwater can be effectively measured by measurement of leachate in the lakes, rivers, or wells.

The phrase "minimizing nutrient leaching into water sources" and/or equivalent expressions refers to a decrease of at least about 1% of nutrient leachate found in a water source e.g., groundwater or a lake or estuary, when two or more measurements of leachate in the water source are compared. Nutrient leachate in a water source is measured by any method known in the art e.g., using porous cup suction lysimeters for measuring nitrogen content. See e.g., Morrison, R. D. 1983. *Ground water monitoring technology: Procedures, equipment and applications*. Timco, Prairie du Sac, Wis.; and Maynard, D. G., and Y. P. Kalra. 1993 *Nitrate and exchangeable ammonium nitrogen*. p. 25-38. In M. R. Carter (ed.) *Soil Sampling and Methods of Analysis* Lewis Publ., Boca Raton, Fla.

In some embodiments "minimizing nutrient leaching into water sources" and/or equivalent expressions refers to a decrease by at least about 1%, 2%, 3%, 4%, 5%, 6%, 7%, 8%, 9%, 10%, 20%, 30%, 40%, 50%, 60%, 70%, 80%, 90% or greater of nutrient leachate found in a water source e.g., groundwater or a lake or estuary, when two or more measurements of leachate in the water source are compared. In other exemplary embodiments, the leaching is completely decreased i.e., nutrient leachate found in a water source is about 95% 96%, 97%, 98% 99% or 100% decreased when two or more measurements of leachate in the water source are compared.

Similarly, the phrase "minimizing pesticide leaching into water sources" and/or equivalent expressions, refers to a decrease by at least 1% of pesticide leachate found in a water source e.g., a lake, estuary or groundwater when two or more measurements of leachate in the water source are compared. Pesticide leachate in a water source is measured by any method known in the art e.g., genetic toxicities of the landfill leachate and groundwater samples were assessed using the *Salmonella*/microsome (Ames test) mutagenicity bioassay, the *Bacillus subtilis* DNA repair bioassay, and the diploid *Aspergillus nidulans* chromosome damage bioassay. See e.g., G E V Schrab, K W V Brown, K C V Donnelly In Water, Air, & Soil Pollution, 1993—Springer Netherlands Volume 69, (1-2): 99-112. In some embodiments "minimizing pesticide leaching into water sources" refers to a decrease by at least about 1%, 2%, 3%, 4%, 5%, 6%, 7%, 8%, 9%, 10%, 20%, 30%, 40%, 50%, 60%, 70%, 80%, 90% or greater of pesticide leachate found in a water source e.g., groundwater or a lake or estuary, when two or more measurements of leachate in the water source are compared. In other exemplary embodiments, the pesticide leaching is completely decreased i.e., pesticide leachate found in a water source is about 95% 96%, 97%, 98% 99% or 100% decreased when two or more measurements of leachate in the water source are compared.

The term "eutrophication" as used herein refers to water pollution caused by the presence of excessive plant nutrients in a water source e.g., lake, pond, and/or estuary. Indeed, "eutrophication" is typically the result of an elevated supply of nutrients e.g., nitrogen and phosphorus, to surface waters. Thus, "eutrophication" is the nutrient enrichment of waters.

Nutrient enrichment stimulates an array of symptomatic changes including, but not limited to, increased phytoplankton and rooted aquatic plant (macrophyte) production, fisheries and water quality degradation and deterioration, and other undesirable changes that interfere with water usage. Thus, the excess of nutrients disrupt the ecosystem enhancing production of primary producers e.g., phytoplankton and aquatic plants. In fact, blooms of phytoplankton are an exemplary indicator of cultural eutrophication.

The term "phytoplankton" as used herein refers to any and/or all aquatic organisms capable of photosynthesis.

"Eutrophication resulting from nutrients entering aquatic ecosystems at an accelerated rate due to human activity is sometimes referred to as, "cultural eutrophication" or "anthropogenic eutrophication. Human activities provide numerous sources of plant nutrients e.g., from agricultural runoff and development e.g., office and housing construction, deforestation, and pollution from septic systems and sewers, to name but a few. Indeed, human-related activities contribute at least about 75% to about 80% of nitrogen and phosphorous currently entering aquatic systems. Thus, cultural or anthropogenic eutrophication is a significant source of water pollution.

The term "layering" as used herein, refers to the process by which a solid or semi-solid mixture is applied above another solid or semi-solid mixture or compound.

I. Introduction

Despite the fact that many plant nutrients are abundant in soils, humans still add fertilizers in order to achieve healthy plants and abundant crop yields. Similarly, to prevent crop destruction and to maintain the beauty of gardens, parks, lawns and etc, humans treat their land and thier plants with pesticides.

Both fertilizers and pesticides are typically added in excess of actual plant needs. Hence, fertilizer and pesticide application tends to result in runoff and leaching, and this in turn, produces water pollution and eutrophication. In fact eutrophication accounts for about half of the impaired lakes, and about 60% of impaired rivers in the U.S. and is also the most widespread pollution problem of U.S. estuaries.

Unfortunately, in the USA, agriculture is one of the most important sources of eutrophic nutrients to lakes and rivers and the third largest source after urban runoff and municipal sewage to estuaries. Furthermore, excessive use of pesticides in agriculture has been implicated as a major source of water pollution. Thus, increasing conversion of native lands to agriculture and development increases the amount of land area that is fertilized and on which pesticides are used, and this in turn, contributes to increased nitrogen, phosphorus and pesticide pollution of water sources.

Clearly then, the preservation and improvement of water quality depends on reducing or eliminating the introduction of excess nutrients and pesticides from agriculture and also from other human activities e.g., home and park maintenance, into the water resources of the Earth. Fortunately, as disclosed herein, fertilizer, pesticide and fertilizer/pesticide formulations and methods of their application have now been discovered that dramatically reduce and/or eliminate plant nutrient, nitrogen, phosphorus, and pesticide leaching into water sources.

II. Fertilizer Formulations

In an exemplary embodiment, fertilizer formulations comprise the macronutrients nitrogen, phosphorous and potassium. In other exemplary embodiments, fertilizer formulations comprise secondary nutrients. In other exemplary embodiments, fertilizer formulations comprise micronutrients. In still other exemplary embodiments, fertilizer formulations comprise secondary nutrients and micronutrients. In still other exemplary embodiments, fertilizer formulations comprise macro nutrients, secondary nutrients and micronutrients.

In one exemplary embodiment, the proportions of plant nutrients are adjusted to meet the needs of a specific crop. In other exemplary embodiments, the proportions of plant nutrients are adjusted to allow for the level of plant available nutrients already present in the soil.

A. Nutrients
  1. Macronutrients: Nitrogen, Phosphorus and Potassium
  a. Nitrogen Good crop yields and healthy plants depend on an adequate supply of nitrogen. Indeed, most non-legume crops require added nitrogen to achieve full productive potential and/or beauty. Lacking sufficient nitrogen, plants typically become yellow and stunted, with smaller than average flowers and fruits e.g., grain crops grown with inadequate nitrogen produce a poor yield with low protein content.

Therefore in an exemplary embodiment, fertilizer formulations comprise nitrogen. Nitrogen occurs in many forms, in two major classes of compounds: organic nitrogen, e.g., proteins, amino acids, and urea, including nitrogen found within living organisms and decaying plant and animal tissues; and inorganic nitrogen, including e.g., ammonium ($NH_4^+$), ammonia gas ($NH_3$), nitrite ($NO_2$), and nitrate ($NO_3$). Only inorganic nitrogen is absorbed by plants.

Nitrogen is typically supplemented by the application of fertilizers, manures, or other high-nitrogen materials e.g., ammonia ($NH_3$), diammonium phosphate (($NH_4$)$_2$HPO$_4$), ammonium nitrate ($NH_4NO_3$), ammonium sulfate (($NH_4$)$_2$SO$_4$), calcium cyanamide ($CaCN_2$), calcium nitrate ($Ca(NO_3)_2$), sodium nitrate ($NaNO_3$), and urea ($N_2H_4CO$).

In one exemplary embodiment, nitrogen in the nutrient component of fertilizer formulations is present in an amount that is in a range of between about 5% weight/weight to about 20% weight/weight of a fertilizer formulation. In other exemplary embodiments nitrogen in the nutrient component of fertilizer formulations is present in an amount of about 1% weight/weight, 2% weight/weight, 3% weight/weight, 4% weight/weight, about 5% weight/weight, about 6% weight/weight, about 7% weight/weight, about 8% weight/weight, about 9% weight/weight, about 10% weight/weight, about 11% weight/weight, about 12% weight/weight, about 13% weight/weight, about 14% weight/weight, about 15% weight/weight, about 16% weight/weight, about 17% weight/weight, about 18% weight/weight, and/or about 19% weight/weight. In other exemplary embodiments the nitrogen in the nutrient component of fertilizer formulations is present in an amount of about 25% weight/weight, about 30% weight/weight, about 35% weight/weight, about 40% weight/weight, about 45% weight/weight, or about 50% weight/weight.

However, in practice, the nitrogen in any given fertilizer formulation depends on the relative amounts of nitrogen and phosphorus the homeowner or land manager wants to deliver to the plants at a particular time. Thus, the percent nitrogen in the nutrient component of the fertilizer is any convenient amount.

In one exemplary embodiment, the nitrogen is present in the form of ammonium ion ($NH_4^+$). In another exemplary embodiment, the nitrogen is present in the form of nitrate ($NO_3$). In still another exemplary embodiment, the nitrogen is present in the form of nitrate ($NO_3$) and ammonium ion.

b. Phosphorus

Phosphorus (P) is a key element in many physiological and biochemical processes. For example, phosphorus occurs in DNA and RNA structures, in the energy transport system of cells, and is involved in photosynthetic processes. A deficiency of phosphorus affects plant growth, development and crop yield, and also the quality of fruit and the formation of seeds. Deficiency can also delay the ripening of crops which can set back the harvest, risking the quality of the produce.

Therefore, in an exemplary embodiment, the fertilizer formulation comprises phosphorus. Typically, phosphorus is supplied as a phosphate, e.g., diammonium phosphate (($NH_4$)$_2$HPO$_4$) or calcium dihydrogen phosphate (Ca($H_2PO_4$)$_2$), However, while supplied as phosphate, phosphorus is typically reported as the amount of $P_2O_5$, the anhydrous form of phosphoric acid. $P_2O_5$, is the form of phosphorus typically utilized by plants (2.29 kg $P_2O_5$ is equivalent to 1.0 kg P).

In an exemplary embodiment, phosphorus in the nutrient component of fertilizer formulations is present in an amount that is in a range of between about 5% weight/weight to about 20% weight/weight of a fertilizer formulation. In other exemplary embodiments phosphorus in the nutrient component of fertilizer formulations is present in an amount of about 1% weight/weight, 2% weight/weight, 3% weight/weight, 4% weight/weight, 5% weight/weight, about 6% weight/weight, about 7% weight/weight, about 8% weight/weight, about 9% weight/weight, about 10% weight/weight, about 11% weight/weight, about 12% weight/weight, about 13% weight/weight, about 14% weight/weight, about 15% weight/weight, about 16% weight/weight, about 17% weight/weight, about 18% weight/weight, and/or about 19% weight/weight. However, as is the case with the nitrogen component of the fertilizer formulation, the phosphorus in any given fertilizer formulation depends on the relative amounts of nitrogen and phosphorus the homeowner or land manager wants to deliver to the plants at a particular time. Thus, the percent phosphorus in the nutrient component of the fertilizer is any convenient amount. In an exemplary embodiment the phosphorus in the nutrient component of fertilizer formulations is present in an amount of about 25% weight/weight, about 30% weight/weight, about 35% weight/weight, about 40% weight/weight, or about 45% weight/weight. In still other exemplary embodiments the phosphorus in the nutrient component of fertilizer formulations is present in an amount of about 50% weight/weight, about 60% weight/weight, or about 80% weight/weight.

c. Potassium

Potassium is a common component of fertilizers. Plants utilize potassium in various physiological processes e.g., potassium participates in the regulation of the water economy of plants, in protein production, and as an enzyme activator.

In an exemplary embodiment, potassium is supplied in the form of potassium sulfate ($K_2SO_4$). In another exemplary embodiment, potassium is supplied in the form of potassium chloride (KCl), which is also called muriate of potash.

Irrespective of the form in which the potassium supplied, the potassium content is typically designated in terms of $K_2O$, or potash. In an exemplary embodiment, potassium is supplied as potassium chloride, KCl. Potassium chloride is 52% by weight potassium. Potash is 83% potassium. Therefore, in another exemplary embodiment, a fertilizer formulation comprising 25% KCl by weight, has a potassium rating, based on potash, of 16.

In one exemplary embodiment, potassium in the nutrient component of fertilizer formulations is present in an amount that is in a range of between about 5% weight/weight to about 20% weight/weight of a fertilizer formulation. In another exemplary embodiment potassium in the nutrient component of fertilizer formulations is present in an amount that is in a range of between about 0% to about 10%. In other exemplary embodiments potassium in the nutrient component of fertilizer formulations is present in an amount of about 0%, about 1% weight/weight, 2% weight/weight, 3% weight/weight, 4% weight/weight, about 5% weight/weight, about 6% weight/weight, about 7% weight/weight, about 8% weight/weight, about 9% weight/weight, about 10% weight/weight, about 11% weight/weight, about 12% weight/weight, about 13% weight/weight, about 14% weight/weight, about 15% weight/weight, about 16% weight/weight, about 17% weight/weight, about 18% weight/weight, and/or about 19% weight/weight. In still other exemplary embodiments the potassium in the nutrient component of fertilizer formulations is present in an amount of about 25% weight/weight, about 30% weight/weight, about 35% weight/weight, about 40% weight/weight, about 45% weight/weight, about 50% weight/weight, about 60% weight/weight, or about 80% weight/weight. However, in practice, the potassium, like the nitrogen and phosphorus, is present in any amount convenient for the purposes of the homeowner or land manager.

2. Secondary Nutrients

The secondary nutrients include calcium (Ca), magnesium (Mg) and sulfur (S). Secondary are utilized by plants in relatively large amounts, but are less likely to be deficient in soils than are the macronutrients. Nonetheless, to attain higher crop yields, secondary nutrients are typically supplemented by way of applied fertilizers.

As is well known in the art, secondary nutrient content of soils and plants typically are identified by way of at least one of soil tests, plant analysis, soil-type, crop species and plant symptoms. In an exemplary embodiment, nutrient deficiency is confirmed or determined by obtaining plant and soil samples from adjacent areas with normal and abnormal plant growth and having them tested at a soil testing laboratory. In another exemplary embodiment, nutrient values below the sufficiency concentration indicate a deficiency and the deficiency is remedied by applying a matrix based fertilizer formulation comprising secondary nutrients.

In an exemplary embodiment, sulfur in the nutrient component of fertilizer formulations is present in an amount that is in a range of between about 0% to about 10%. In other exemplary embodiments sulfur in the nutrient component of fertilizer formulations is present in an amount of about 0%, about 1% weight/weight, 2% weight/weight, 3% weight/weight, 4% weight/weight, about 5% weight/weight, about 6% weight/weight, about 7% weight/weight, about 8% weight/weight, or about 9% weight/weight.

In an exemplary embodiment, calcium in the nutrient component of fertilizer formulations is present in an amount that is in a range of between about 0% to about 10%. In other exemplary embodiments calcium in the nutrient component of fertilizer formulations is present in an amount of about 0%, about 1% weight/weight, 2% weight/weight, 3% weight/weight, 4% weight/weight, about 5% weight/weight, about 6% weight/weight, about 7% weight/weight, about 8% weight/weight, or about 9% weight/weight.

In an exemplary embodiment, magnesium in the nutrient component of fertilizer formulations is present in an amount that is in a range of between about 0% to about 10%. In other exemplary embodiments magnesium in the nutrient component of fertilizer formulations is present in an amount of about 0%, about 1% weight/weight, 2% weight/weight, 3% weight/weight, 4% weight/weight, about 5% weight/weight, about 6% weight/weight, about 7% weight/weight, about 8% weight/weight, or about 9% weight/weight.

3. Micronutrients

Micronutrients are needed in very small amounts (g/ha) compared with macronutrients (kg/ha). However if there is a micronutrient deficiency, crop yield and quality are affected. Therefore, in an exemplary embodiment, the matrix based fertilizer formulation comprises micronutrients.

As is known in the art, micronutrients include boron (B), copper (Cu), iron (Fe), manganese (Mn), molybdenum (Mo) and zinc (Zn). These elements may also be referred to as minor or trace elements.

Micronutrient content is typically identified by way of at least one of: soil tests, plant analysis, soil-type, crop species and plant symptoms. In an exemplary embodiment, micronutrient deficiency is confirmed or determined by obtaining plant and soil samples from adjacent areas with normal and abnormal plant growth and having them tested at a soil testing laboratory. In another exemplary embodiment, micronutrient values below the sufficiency concentration indicate a deficiency and the deficiency is remedied by applying a matrix based fertilizer formulation comprising micronutrients.

In an exemplary embodiment, micronutrients in the nutrient component of fertilizer formulations are present in an amount that is in a range of between about 0% to about 10%. In other exemplary embodiments micronutrients in the nutrient component of fertilizer formulations is present in an amount of about 0%, about 1% weight/weight, 2% weight/weight, 3% weight/weight, 4% weight/weight, about 5% weight/weight, about 6% weight/weight, about 7% weight/weight, about 8% weight/weight, or about 9% weight/weight. However, as with all components of the matrix based fertilizer formulation, micronutrients are present in any amount convenient for the user.

As a member of the matrix component of the matrix based fertilizer formulation ferric ion may occur in amounts not typical for micronutrients.

B. Combining Nutrient Elements of Fertilizer Formulations

In one aspect, plant nutrients are combined to make a variety of fertilizer formulations that are suitable for a large number of different applications. In an exemplary embodiment, the fertilizer formulation comprises a novel mixture of one or more macronutrients e.g., nitrogen (N), phosphorus (P), and potassium (K) compounds. In another exemplary embodiment, the fertilizer formulation comprises one or more secondary nutrients e.g., calcium (Ca), magnesium (Mg), sulfur (S). In another exemplary embodiment the fertilizer formulation comprises one or more micronutrients e.g., boron (B), zinc (Zn), copper (Cu), and etc. In still other exemplary embodiments, the fertilizer formulation comprises novel mixtures of one or more macronutrients, one or more secondary nutrients and/or one or more micronutrients.

Suitable sources of macronutrients, secondary nutrients and micronutrients will be readily apparent to those of skill in the art. For example, suitable sources of nitrogen compounds include, e.g., urea, ammonium nitrate, ammonium phosphate, ammonium sulfate, urea phosphate, and ammonium molybdate, among others. Sources of phosphorus include, e.g., phosphorous acids and salts thereof, e.g., phosphite. Potassium may be readily obtained from, e.g., potassium nitrate, potassium hydroxide, potassium phosphate, potassium sulfate, or potassium chloride.

Preparation of a fertilizer formulation for any given application will take a number of factors into account (see e.g., *Manual of Fertilizer Processing*, Nielsson, F. T., ed., Marcel Dekker Inc. (1987)). These factors include, but are not limited to: establishing the macronutrient requirements for the anticipated application, establishing the requirements for secondary nutrients and establishing micronutrient requirements for the anticipated application. As is known in the art, nutrient requirements are influenced by a number of factors including, but not limited to type of crop or plant; soil properties e.g., soil carbon, soil pH; climate and weather conditions; growing environment e.g., Northwest as compared to southeastern U.S.; to name a few. Thus, the actual amounts of nutrients in the formulation will vary according to the anticipated nutrient needs, as well as application conditions and location.

All plants apart from nitrogen fixing legumes are suceptible to nitrogen deficiency. Symptoms include poor plant growth, leaves are pale green or yellow in the case of brassicas. Lower leaves show symptoms first. Leaves in this state are said to be etiolated with reduced chlorophyll. Flowering and fruiting may be delayed. Therefore, the nutrient component of fertilizer formulations typically comprises at least about 1% total nitrogen by weight. In other exemplary embodiments, the nutrient component of fertilizer formulations comprises at least about 5% total nitrogen by weight. In some exemplary embodiments the nutrient component of fertilizer formulations comprises between at least about 10% to about 50%; at least about 15% to about 40%, and/or at least about 20% to about 30%, by weight, total nitrogen, in the various forms of nitrogen containing compounds.

The acidifying effect of a particular fertilizer is a consideration in preparing a fertilizer formulation since different plants have different soil acidity preferences. In an exemplary embodiment, pH adjustments are made by choosing an appropriate form of nitrogen to incorporate into the fertilizer formulation. For example, nitrogen in the form of ammonium has an acidic reaction in the soil, while nitrogen as nitrates has an alkaline reaction. Thus, in an exemplary embodiment, the pH of acidic soils is raised by the application of fertilizer formulations comprising nitrates. In another exemplary embodiment, the pH of acidic soils is maintained in an acidic state e.g., for growing acid loving plants e.g., rhododendrons, by the application of fertilizer formulations comprising ammonium.

In other exemplary embodiments, fertilizer formulations comprise potassium compounds. Supplying potassium in the fertilizer formulation protects plants from potassium deficiency, also known as potash deficiency. Potassium deficiency is a plant disorder common on light, sandy soils, as well as chalky or peaty soils with a low clay content. It is also found on heavy clays with a poor structure. Typical symptoms are brown scorching and curling of leaf tips, and yellowing of leaf veins. Purple spots may also appear on the leaf undersides.

Both the plant and soil can be tested for K deficiency by methods known in the art (see e.g., *Plant Nutrition Manual*, Jones, J. Benton Jr., CRC Press (1998) and M. R. Carter (ed.) *Soil Sampling and Methods of Analysis* Lewis Publ., Boca Raton, Fla.)

In an exemplary embodiment, the nutrient component of fertilizer formulations comprises at least about 1% total potassium by weight. In other exemplary embodiments, the nutrient component of fertilizer formulations comprises at least about 5% total potassium by weight; at least about 10% to about 80%; at least about 20% to about 60%; at least about 30% to about 40%, by weight, of total potassium. In other exemplary embodiments the fertilizer formulation comprises no potassium.

In other exemplary embodiments, fertilizer formulations comprise phosphorus. All plants can suffer phosphorus deficiency. Symptoms include poor growth, and leaves that turn blue/green but not yellow with the oldest leaves affected first. Typically plants suffering phosphorus deficiency produce fruits that are small and acid tasting. Phosphorus deficiency may be confused with nitrogen deficiency. Plants can also suffer from phosphate poisoning when given too much phosphorus. Thus, fertilizer formulations are designed to provide the right level for a particular plant type, i.e., neither too high nor too low. A person of skill in the art can readily determine the correct amount of phosphorus (and other nutrients) by consultation with any of a number of publications that recite the nutrient requirements for particular plants (see e.g., *Plant Nutrition Manual*, Jones, J. Benton Jr., CRC Press (1998)).

Thus, in an exemplary embodiment, the amount of phosphorus to incorporate in a fertilizer formulation designed for a particular application, is determined by first ascertaining the crop requirement and then determining the quantity of phosphorus already present in the soil solution and in the readily available pool prior to fertilization.

As is known in the art, phosphorus content can be determined, for example, by extracting the phosphorus with a suitable reagent from a representative soil sample for analysis. The amount of phosphorus extracted gives an indication of how the crops will respond to a fresh application of phosphatic fertilizer e.g., high, medium or low responsiveness. In an exemplary embodiment, the yield of a crop grown on a "highly responsive" soil, is greatly increased in response to the application of phosphorus. In this embodiment, the soil is low in phosphorus relative to the needs of the particular crop plant to be grown. Therefore, supplementation has a large effect. In another exemplary embodiment, there is more available phosphorus for the crop plant already present in the soil, and the increase in yield due to phosphorus supplementation is less. In some exemplary embodiments, there may be no increase in yield on soils with substantial readily available phosphorus reserves.

In an exemplary embodiment, phosphorus is supplied in the form of potassium phosphate, or ammonium phosphate. In another exemplary embodiment, phosphorus is supplied in the form of phosphite. Typically, the nutrient component of the fertilizer formulation comprises at least about 1% total phosphorus. In an exemplary embodiment, the nutrient component comprises at least about 5% total phosphorus. In other exemplary embodiments, the nutrient component of the fertilizer formulation comprises between about 10% to about 80%; by weight, about 20% to about 60%; or about 30% to about 50%; by weight, total phosphorus.

In other exemplary embodiments, fertilizer formulations comprise secondary and/or micronutrients. A variety of sources of conventional secondary and micronutrients are known. The secondary nutrients include, but are not limited to calcium ($Ca^{2+}$), sulfur (S), and magnesium ($Mg^{2+}$). The micronutrients include, but are not limited to: boron, cobalt, copper, iron, zinc, manganese, and molybdenum. The secondary and micro nutrients typically appear in fertilizer formulations in forms that include, but which are not limited to: magnesium sulfate, calcium nitrate, sodium borate, magnesium nitrate, chelated complexes of copper, calcium, iron, zinc, magnesium, manganese, ammonium or sodium molybdate, and mixtures thereof. In exemplary embodiments, each of these micronutrients is independently present in an amount that is in a range of between about 0% to about 10%. In other exemplary embodiments each of these micronutrients is independently present in an amount that is in a range of between about 0.01% to about 10%. In one exemplary embodiment, each of these micronutrients totals about 1% to about 3%, by weight, of the total nutrient component of the fertilizer formulation. In other exemplary embodiments, the total amount of one or of each these micronutrients totals about 2%, by weight, of the total nutrient component of the fertilizer formulation.

The content of secondary and micronutrients in soil and in plant tissues is determined by methods known in the art (see e.g., *Methods of Soil Analysis*. Part 3. *Chemical Methods*. D. L. Sparks ed. 49-64. American Society of Agronomy, Madison, Wis.).

In an exemplary embodiment, nutrient compositions of fertilizer formulations are developed based on results of field experiments by methods known in the art. In one exemplary embodiment, the phosphorus requirement is tested by increasing the amounts of phosphorus that are applied to plots that are otherwise receiving adequate amounts of all other nutrients. The optimum application is determined from response curves which relate the crop yields to the different amounts of phosphorus applied. Similarly the need for secondary and micronutrients is determined through the use of field tests see e.g., *Methods of soil analysis*. Part 3. Chemical methods. D. L. Sparks ed. 49-64. American Society of Agronomy, Madison, Wis. Thus, in exemplary embodiments, the amount of a nutrient needed for optimum production (as defined by the grower) is determined by varying the amount of nutrient in question while holding the amount of other nutrients (which are in adequate supply), constant.

Field experiments typically are too expensive to be carried out on all the crops grown in all the different farming systems and on all soil types. Therefore, once the amount of nutrient needed to achieve optimum yield is identified, it will be considered appropriate for all other soils of the same type. Thus, in an exemplary embodiment, reliable fertilizer recommendations are established by methods known in the art, from a limited number of field experiments.

C. Pesticides

In exemplary embodiments, the matrix based fertilizer formulation minimizes, reduces, and/or eliminates, pesticide leaching into water sources. Exemplary pesticides include, but are not limited to 2,4-D, a chlorinated phenoxy compound; thiophanate methyl, carbaryl a wide-spectrum carbamate also known as carbaryl is 1-naphthol N-methylcarbamate; malathion; metochlor and diazinon.

D. High Ionic Exchange Matrix

1. Semi-Soluble Decomposable Polymers

Semi-soluble decomposable polymers typically have high ionic exchange capacities. In exemplary embodiments, chitosan, lignin, starch and cellulose are semi-soluble decomposable polymers used in the matrix based fertilizer. In other exemplary embodiments, polyacrylamide is a semi-soluble decomposable polymer used in the matrix based fertilizer formulation. Other polymeric materials, such as those disclosed in U.S. Pat. Nos. 6,864,245; 6,846,518; 6,730,722; 6,540,792; 6,723,430; and 6,939,557 are also suitable for use in the matrix based fertilizer formulation.

a. Starch

Most starches comprise two glucose polymers known in the art as amylose and amylopectin. Amylose is an $\alpha(1,4)$-linked glucose polymer which is essentially a linear chain without branching. Amylopectin is a branched glucose polymer in which branch chains are linked to the main chain of $\alpha(1,4)$-linked polymer by $\alpha(1,6)$-linkages. The linear glucose polymers are synthesized by the action of starch synthases which produce the $\alpha(1,4)$-linkages. The $\alpha(1,6)$-linkages of amylopectin are produced by the action of branching enzymes.

Starch, in its raw state, is typically found in the form of dense granules that range in size from 2 microns in wheat starch, to over 100 microns in potato starch. Starch granules are highly organized, comprising of a series of concentric spheres consisting of alternating crystalline and amorphous regions (see e.g., Cameron and Donald (1992) Polymer 33:2628-2635).

Most starch is use today is derived from plants. In plants, starch is synthesized by a series of enzymatic reactions (see e.g., Advances in Food and Nutrition Research, Vol. 41 supra; Martin and Smith (1995) Plant Cell. 7:971-985; Myers et al., (2000) Plant Physiol. 122: 989-997). Genes or cDNAs of most starch biosynthetic enzymes from corn, potato, barley, and wheat have been cloned, and the cloned genes have been used to over- or under-express starch biosynthetic enzymes. Thus, in an exemplary embodiment, starch is from a transgenic plant that expresses one or more cloned starch biosynthetic genes.

Starch structures differ in different species. For example, barley and wheat amylopectins have larger portions of short branch chains (6 to 14 glucose units), have proportionally fewer branch chains of 11 to 22 glucose units and >40 glucose units, and larger proportions of branch linkages located within the crystalline region when compared to e.g., maize amylopectin (Jane et al., (1999) Cereal Chem. 76(5): 629-637; and Song and Jane, (2000) Carbohydrate Polymers. 41:365-377).

Similarly, the relative proportions of amylose and amylopectin differ in starches derived from different species. For example, amylose content of wheat starch is about 0% for waxy wheat cultivars and about 22-30% (about 29% on average) for normal (non-waxy) wheat cultivars. Some maize cultivars yield corn starch in which the amylose content is as high as about 60-70%. Among various rice varieties, Indica rice grain has a higher amylose content than Japonica rice grain.

The amylose and amylopectin content of starch can be measured by methods known in the art. In exemplary embodiments, amylose content is measured by the colorimetric method disclosed by Kuroda et al. (Jpn. J. Breed. 39 (Suppl. 2):142-143, (1989)) and/or by amperometric titration (see e.g., Fukuba and Kainuma, "*Quantification of Amylose and Amylopectin*" in: Starch Science Handbook, Nakamura M. and Suzuki S., eds Tokyo: Asakura Shoten, pp 174-179, 1977 each of which are incorporated herein by reference). Starch concentration of solutions can be determined e.g., by the phenol-sulfuric acid method (Dubois et al., (1956) Anal. Chem. 28:350-356 which is incorporated herein by reference) with glucose as a standard.

As noted above, starch is found in nearly every type of plant tissue including, but not limited to the fruit, seeds, stems, leaves, rhizomes and/or tubers. Isolation of starch from plants may be achieved by methods known in the art. Exemplary methodology is disclosed in e.g., Advances in Food and Nutrition Research, Vol. 41: *Starch: Basic Science to Biotechnology*, Mirta Noemi Sivak and Jack Preiss eds. Academic Press (1998); *Starch Chemistry and Technology*, R. L. Whistler ed., Academic Press (1984); *Starch: Properties and Potential*, Galliard, T., ed., John Wiley and Sons (1987).

Starch is the most degradable component of the matrix based fertilizer formulation. Accordingly, in an exemplary embodiment, starch is added to the matrix based fertilizer formulation to enhance degradability of the final formulation. In an exemplary embodiment, starch is present in the matrix component of the matrix based fertilizer formulation in an amount of at least about 25% weight/weight. In other exemplary embodiments starch is present in the matrix component of the matrix based fertilizer formulation in an amount of at least about 30% weight/weight, 35% weight/weight, 40% weight/weight, 45% weight/weight, or at least about 50% weight/weight. In another exemplary embodiment starch is present in the matrix component of the matrix based fertilizer formulation in an amount of at least about 20% weight/weight. In still other exemplary embodiments, starch is present in the matrix component of the matrix based fertilizer formulation in an amount of at least about 19% weight/weight, at least about 18% weight/weight, at least about 17% weight/weight, at least at least about 16% weight/weight, at least about 15% weight/weight, at least about 14% weight/weight, at least about 13% weight/weight, at least about 12% weight/weight, at least about 11% weight/weight, at least about 10% weight/weight, at least about 9% weight/weight, at least about 8% weight/weight, at least about 7% weight/weight, at least about 6% weight/weight, at least about 5% weight/weight, at least about 4% weight/weight, at least about 3% weight/weight, at least about 2% weight/weight, and/or at least about 1% weight/weight.

b. Chitosan

Chitosan is a linear polysaccharide composed of randomly distributed β-(1-4)-linked D-glucosamine (deacetylated unit) and N-acetyl-D-glucosamine (acetylated unit). Chitosan is produced commercially by deacetylation of chitin.

Chitin is a natural polysaccharide present in various marine and terrestrial organisms, including crustacea, insects, mollusks, and microorganisms, e.g., fungi. The structure of chitin is that of an unbranched polymer of 2-acetoamido-2-deoxy-D-glucose (N-acetyl-D-glucosamine). Chitin is typically an amorphous solid that is largely insoluble in water, dilute acids, and alkali. Although chitin has various commercial applications, greater commercial utility is found by converting chitin to the deacetylated product chitosan.

As noted above, chitosan is typically prepared by N-deacetylation of the chitin polymer. Any of the numerous methods known in the art can be used to obtain chitosan. See e.g., U.S. Pat. No. 4,806,474, U.S. Pat. No. 4,806,474, U.S. Pat. No. 6,255,085, U.S. Pat. No. 6,890,913 and U.S. Pat. No. 6,972,284. The degree of deacetylation of chitin (% DA) can be determined by NMR spectroscopy, and the % DA in commercial chitosans is typically in the range 60-100%. The more complete the deacetylation, the more readily soluble is the chitosan in slightly acidic solution.

and Nutrition Volume 43(2):145-171). Calculation of the appropriate mix would then be made taking into account particulars climate and soil type. In an exemplary embodiment, equal amounts of starch, chitosan or cellulose and lignin are used to prepare the matrix based fertilizer formulation.

Chitosan is an intermediately degradable component of the matrix based fertilizer formulation. Chitosan is less degradable than starch yet more degradable than cellulose or lignin. Accordingly, in an exemplary embodiment, chitosan is added to the matrix based fertilizer formulation to balance degradability of the final formulation.

In an exemplary embodiment, chitosan is present in an amount of at least about 25% weight/weight. In other exemplary embodiments chitosan is present in the matrix component of the matrix based fertilizer formulation in an amount of at least about 30% weight/weight, 35% weight/weight, 40% weight/weight, 45% weight/weight, or at least about 50% weight/weight. In another exemplary embodiment chitosan is present in the matrix component of the matrix based fertilizer formulation in an amount of at least about 20% weight/weight. In still other exemplary embodiments, chitosan is present in the matrix component of the matrix based fertilizer formulation in an amount of at least about 19% weight/weight, at least about 18% weight/weight, at least about 17% weight/weight, at least about 16% weight/weight, at least about 15% weight/weight, at least about 14% weight/weight, at least about 13% weight/weight, at least about 12% weight/weight, at least about 11% weight/weight, at least about 10% weight/weight, at least about 9% weight/weight, at least about 8% weight/weight, at least about 7% weight/weight, at least about 6% weight/weight, at least about 5% weight/weight, at least about 4% weight/weight, at least about 3% weight/weight, at least about 2% weight/weight, and/or at least about 1% weight/weight.

c. Cellulose

Cellulose is a long-chain polymer of beta-glucose having a formula of $(C_6H_{10}O_5)_n$, Cellulose is the main component of plant cell walls, and is the most abundant biopolymer on Earth. Cotton is the purest natural form of cellulose. The chemical structure of cellulose is shown below:

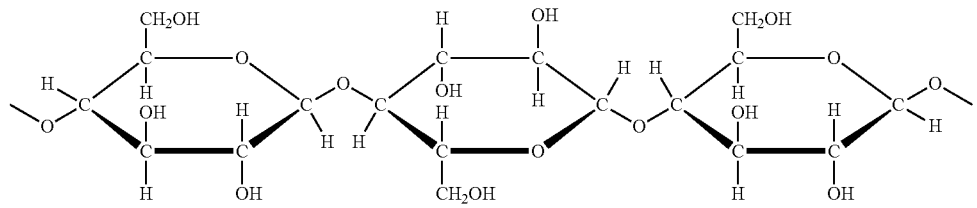

The amino group in chitosan has a pKa value of ~6.5, thus, chitosan is positively charged and soluble in acidic to neutral solution with a charge density dependent on pH and the % DA-value. Chitosan can function as a bioadhesive readily binding to negatively charged surfaces.

Chitosan be decomposed by soil microbes. The structure of chitosan influences its degradability. A person of skill in the art can estimate the amount of chitosan needed for creating a matrix with a certain desired rate of degradation by evaluating the degradation rate of chitosan as compared to starch and lignin. The degradation and other properties of chitin and chitosan are known in the art (see e.g., J. Synowiecki and Al-Khateeb, N. A., (2003) Critical Reviews in Food Science The length of the cellulose chain varies greatly, from a few hundred sugar units in wood pulp to over 6000 units for cotton.

Cellulose is another intermediately degradable componet of the matrix based fertilizer formulation. Cellulose is less degradable than starch and chitosan, yet more degradable than lignan (see e.g., Entry, J. A., et al. (1991) Biology and Fertility of Soils. 11:75-78; Donnelly, P. K., et al. (1990) Microbial Ecology 20:289-295; Entry, J. A., et al. (1993) European Journal of Forest Pathology 23:129-137; Entry, J. A. and C. B. Backman (1995) Canadian Journal of Forest Research 25:1231-1236; Entry, J. A. (2000) Biology and Fertility of Soils. 31:436-440).

Accordingly, in an exemplary embodiment, cellulose is added to the matrix based fertilizer formulation to balance degradability of the final formulation.

In an exemplary embodiment, cellulose is present in the matrix component of the matrix based fertilizer formulation in an amount of at least about 25% weight/weight. In other exemplary embodiments cellulose is present in the matrix component of the matrix based fertilizer formulation in an amount of at least about 30% weight/weight, 35% weight/weight, 40% weight/weight, 45% weight/weight, or at least about 50% weight/weight. In another exemplary embodiment cellulose is present in the matrix component of the matrix based fertilizer formulation in an amount of at least about 20% weight/weight. In still other exemplary embodiments, cellulose is present in an amount of at least about 19% weight/weight, at least about 18% weight/weight, at least about 17% weight/weight, at least about 16% weight/weight, at least about 15% weight/weight, at least about 14% weight/weight, at least about 13% weight/weight, at least about 12% weight/weight, at least about 11% weight/weight, at least about 10% weight/weight, at least about 9% weight/weight, at least about 8% weight/weight, at least about 7% weight/weight, at least about 6% weight/weight, at least about 5% weight/weight, at least about 4% weight/weight, at least about 3% weight/weight, at least about 2% weight/weight, and/or at least about 1% weight/weight d. Lignin After cellulose, lignin is the second most abundant terrestrial biopolymer, accounting for approximately about 30% of the organic carbon in the biosphere. Lignins are comprised mainly of from three hydroxycinnamyl alcohol monomers, p-coumaryl, coniferyl, and sinapyl alcohol, that differ in their degrees of methoxylation. These monolignols produce p-hydroxyyphenyl (H), guaiacyl (G), and syringyl (S) phenylpropanoid units when incorporated into the lignin polymer (see e.g., Boerjan, W., et al. (2003) Annu. Rev. Plant Biol. 54:519-546).

Most lignins are comprised predominantly of the G and S units, with the H units as a minor component (see e.g., Grabber, J. H., et al. (2004) C. R. Biologies 327:455-465). Although lignins are comprised of only three building blocks, the composition and structure of lignins is quite variable within and among plants. Fortunately however, the structural variability does not have a significant influence on degradability (see e.g., *Properties and Usage of Lignin*, Thomas Q. Hu ed., (2002) Plenum Pub. Corp.; Crawford, R. L. (1981) *Lignin Biodegradation and Transformation* John Wiley and Sons; and Entry, J. A., et al. (1991) supra; Donnelly, P. K., et al. (1990) supra; Entry, J. A., et al. (1993) supra; Entry, J. A. and C. B. Backman (1995) supra; Entry, J. A. (2000) supra).

Methods for obtaining lignin are known in the art (see e.g., U.S. Pat. No. 6,767,565 and U.S. Pat. No. 5,210,230). However, any method known in the art is can be used for preparing lignin for purposes of formulating the matrix component of the fertilizer formulation.

Lignin is the least degradable component of the matrix based fertilizer formulation. Accordingly, in an exemplary embodiment, lignin is added to the matrix based fertilizer formulation to retard degradability of the final formulation. In an exemplary embodiment, lignin is present in the matrix component of the matrix based fertilizer formulation in an amount of at least about 25% weight/weight. In other exemplary embodiments lignin is present in the matrix component of the matrix based fertilizer formulation in an amount of at least about 30% weight/weight, 35% weight/weight, 40% weight/weight, 45% weight/weight, or at least about 50% weight/weight. In another exemplary embodiment lignin is present in the matrix component of the matrix based fertilizer formulation in an amount of at least about 20% weight/weight. In still other exemplary embodiments, lignin is present in an amount of at least about 19% weight/weight, at least about 18% weight/weight, at least about 17% weight/weight, at least about 16% weight/weight, at least about 15% weight/weight, at least about 14% weight/weight, at least about 13% weight/weight, at least about 12% weight/weight, at least about 11% weight/weight, at least about 10% weight/weight, at least about 9% weight/weight, at least about 8% weight/weight, at least about 7% weight/weight, at least about 6% weight/weight, at least about 5% weight/weight, at least about 4% weight/weight, at least about 3% weight/weight, at least about 2% weight/weight, and/or at least about 1% weight/weight.

2. Metals

Metal compounds comprise the inorganic component of the matrix comprising the matrix based fertilizer formulation. Some exemplary metal compounds include iron aluminum and magnesium. Some of these exemplary metal compounds are discussed further below disclosed below.

a. Iron

In an exemplary embodiment, the metal compound is an iron based compound.

In one exemplary embodiment, the iron compound is ferric sulfate. In another exemplary embodiment, the ferric sulfate is present in the matrix formulation in an amount that is in a range that is between about 4.0% weight/weight to about 15.5% weight/weight. In another exemplary embodiment the ferric sulfate is present in the matrix formulation in an amount that is at least about 5.0% weight/weight. In still other exemplary embodiments the ferric sulfate is present in the matrix formulation in an amount that is at least about 6.0% weight/weight, at least about 7.0% weight/weight, at least about 8.0% weight/weight, at least about 9.0% weight/weight, at least about 10.0% weight/weight, at least about 11.0% weight/weight, at least about 12.0% weight/weight, at least about 13.0% weight/weight, at least about 14.0% weight/weight and/or at least about 15.0% weight/weight.

In one exemplary embodiment, the iron compound is ferric citrate. In another exemplary embodiment, the iron compound is ferric oxide.

Methyl mercury, $HgSO_4$, is a compound that is readily taken up by plants. Mercury in the atmosphere can mix with volatilized sulfate anion from the fertilizer formulation to form $HgSO_4$. Therefore in situations wherein atmospheric mercury concentrations are relatively high e.g., areas where mercury mining operations occur, ferric citrate can be used in place of ferric sulfate to minimize unwanted mercury uptake by plants.

In an exemplary embodiment, the ferric citrate is present in the matrix formulation in an amount that is in an amount that is in a range that is between about 4.0% weight/weight to about 15.5% weight/weight. In another exemplary embodiment the ferric citrate is present in the matrix formulation in an amount that is at least about 5.0% weight/weight. In still other exemplary embodiments the ferric citrate is present in the matrix formulation in an amount that is at least about 6.0% weight/weight, at least about 7.0% weight/weight, at least about 8.0% weight/weight, at least about 9.0% weight/weight, at least about 10.0% weight/weight, at least about 11.0% weight/weight, at least about 12.0% weight/weight, at least about 13.0% weight/weight, at least about 14.0% weight/weight and/or at least about 15.0% weight/weight. In general, the more metal compounds e.g., iron, present in the matrix formulation, the more nitrogen and phosphorus will be held by the matrix.

b. Aluminum

In an exemplary embodiment, the metal compound is an aluminum based compound. In one exemplary embodiment the aluminum compound is hydrated aluminum sulfate. In another exemplary embodiment, the hydrated aluminum sulfate is present in the matrix component of the formulation in an amount between about 0% weight/weight to about 10.0% weight/weight. In another exemplary embodiment, the hydrated aluminum sulfate is present in the matrix component of the formulation in an amount between about 0.01% weight/weight to about 5.0% weight/weight.

In another exemplary embodiment, the aluminum compound is aluminum hydroxide. As noted above, mercury in the atmosphere can mix with volatilized sulfate anion from the fertilizer formulation to form $HgSO_4$. Therefore in situations wherein atmospheric mercury concentrations are relatively high e.g., areas where mercury mining operations occur, aluminum hydroxide can be used in place of aluminum sulfate to minimize unwanted mercury uptake by plants. In an exemplary embodiment, the aluminum hydroxide is present in the matrix component of the formulation in an amount between about 0% weight/weight to about 10.0% weight/weight.

In other exemplary embodiments the aluminum hydroxide is present in the matrix formulation in an amount that is at least about 1.0% weight/weight. In still other exemplary embodiments the aluminum hydroxide is present in the matrix formulation in an amount that is at least about 2.0% weight/weight, at least about 3.0% weight/weight, at least about 4.0% weight/weight, at least about 5.0% weight/weight, at least about 6.0% weight/weight, at least about 7.0% weight/weight, at least about 8.0% weight/weight, at least about 9.0% weight/weight, or at least about 10.0% weight/weight.

As noted above, in general, the more metal compounds e.g., aluminum, present in the matrix formulation, the more nitrogen and phosphorus will be held by the matrix.

E. Formulating the Components of the High Ionic Exchange Matrix

Matrix based formulations comprise a range of common inorganic nutrient compounds combined with aluminum compounds and/or iron (ferric) compounds and the high ionic exchange compounds starch, chitosan, cellulose and lignin. In an exemplary embodiment, these formulations allow nutrients to bind with the aluminum compounds and/or iron (ferric) compounds—lignin—chitosan matrix substantially reducing leaching. In an exemplary embodiment, matrix based formulations comprise inorganic N and P in compounds that are relatively loosely bound (MBF1) to more moderately bound (MBF2) and more tightly compounds (MBF3). See e.g., Table 1 in Example 1.

In some exemplary embodiments, each of starch, chitosan, cellulose, lignin, aluminum sulfate, aluminum hydroxide, ferric sulfate of ferric citrate is present, or not, in a range from between about 0% to about 100% in the matrix based fertilizer formulation depending on the land manager's objectives.

In exemplary embodiments the matrix component comprises between about 30% by weight to about 60% by weight of the total matrix based fertilizer formulation, metal ions comprise between about 10% by weight to about 30% by weight of the total matrix based fertilizer formulation and the nutrient component comprises between about 30 by weight to about 50% by weight of the total matrix based fertilizer formulation.

In one exemplary embodiment, the semi-soluble decomposable polymers comprise 30-60% percent by weight of the total matrix based fertilizer formulation. In another exemplary embodiment, the semi-soluble decomposable polymers comprise 45% percent by weight of the total matrix based fertilizer formulation. In another exemplary embodiment, the semi-soluble decomposable polymers comprise 44% percent by weight of the total matrix based fertilizer formulation. In another exemplary embodiment, the semi-soluble decomposable polymers comprise 42% percent by weight of the total matrix based fertilizer formulation.

In one exemplary embodiment, aluminum sulfate and iron sulfate together comprise 13% by weight of the total matrix based fertilizer formulation. In another exemplary embodiment, aluminum sulfate and iron sulfate together comprise 17% by weight of the total matrix based fertilizer formulation. In another exemplary embodiment, aluminum sulfate and iron sulfate together comprise 22% by weight of the total matrix based fertilizer formulation.

In one exemplary embodiment, the nutrient component of the formulation comprises 42% by weight of the total matrix based fertilizer formulation. In another exemplary embodiment, the nutrient component of the formulation comprises 39% by weight of the total matrix based fertilizer formulation. In another exemplary embodiment, the nutrient component of the formulation comprises 36% by weight of the total matrix based fertilizer formulation.

Without being bound by theory, it is believed that the matrix based fertilizer formulations bind N and P to a matrix comprising metal compounds and high ionic exchange matrix. After the high ionic exchange matrix and metal compounds are applied to the soil, soil microorganisms degrade the starch in the matrix comparatively rapidly and create some ionic exchange sites. The chitosan degrades less rapidly than starch but more rapidly than lignin, and typically retains most of its ionic exchange sites for at least one year in most soil environments. The lignin component in the matrix degrades more slowly than starch and chitosan and typically retains its ionic exchange sites for several years in most soil environments. Therefore, in an exemplary embodiment, nutrient availability and leaching is controlled by varying the relative amounts of starch-chitosan-cellulose-lignin matrix with metal compounds in the mixture.

Accordingly, matrix based fertilizer formulations are crafted according to the particular fertilizer/pesticide application in question. In an exemplary embodiment, the high ionic exchange matrix is formulated so that nutrients are retained over a relatively longer period of time e.g., at least about one and a half years, at least about two years, at least about three years. In another exemplary embodiment, the high ionic exchange matrix is formulated so that nutrients are retained over a relatively shorter period of time e.g., for about single growing season, which is about 90 days, for at least about six months, and/or at least about one year.

As noted above, starch is the most degradable component of the high ionic exchange matrix, followed in descending order of degradability, by chitosan, cellulose and lignin. Therefore, in general, the rate at which the matrix degrades is influenced by the relative proportions of starch, chitosan, cellulose and lignin that comprise the matrix. Thus, by understanding the bonding energies of ammonium, nitrate and the various species of phosphorus to starch, chitosan, cellulose and lignin (see e.g., Handbook of Chemistry and Physics, 87th edition. CRC press Boca Raton, Fla. 2608 pp. and Entry, J. A. (2000), supra) and the degradation properties of starch, chitosan, cellulose and lignin, a matrix based fertilizer formulation can be designed for any application.

In an exemplary embodiment, the high ionic exchange matrix comprises chitosan, lignin, and starch. In another exemplary embodiment, the high ionic exchange matrix comprises cellulose, chitosan, lignin, and starch, In another exemplary embodiment, the high ionic exchange matrix comprises chitosan, lignin, starch, aluminum sulfate and ferric sulfate.

In an exemplary embodiment, chitosan is present in an amount of about 20% weight/weight; lignin is present in an amount of about 20% weight/weight; starch is present in an amount of about 20% weight/weight, hydrated aluminum sulfate is present in an amount between about 0.01% weight/weight to about 5.0% weight/weight; and ferric sulfate is present in an amount between about 4.0% weight/weight to about 15.5% weight/weight. In one embodiment, the metal components of the high ionic exchange matrix are mixed in with the polymer component of the high ionic exchange matrix. In another exemplary embodiment, the polymer component of the high ionic exchange matrix is layered over the metal component of the high ionic exchange matrix.

III. Direct Measurement of Nutrient Levels in Water Sources

A. Nitrogen

Nitrogen in the forms of $NH_4^+$ and nitrates can be measured by methods known in the art (see e.g., Greenberg et al. (1992) *Standard Methods for the Examination of Water and Wastewater,* 18th edition. American Public Health Association, Washington D.C. 20005. In an exemplary embodiment, $NH_4^+$ and nitrates are measured in water samples by filtering the sample through a Whatman 0.45 micron filter and then nitrate and $NH_4^+$ are directly measured using a Lachat Automated Ion Analyzer (Quickchem 8000 Systems, Milwaukee, Wis.).

B. Phosphorus

Phosphorus (P) is an essential nutrient for growth and development of algae and other aquatic plants. Therefore phosphorus, in excess at least about 25 μg to 100 μg total phosphorus per liter, or more, can cause water pollution and eutrophication of water sources.

Eutrophication (nutrient-rich condition) can significantly increase growth of aquatic plants, algae, and strains of algae that cause taste, odor, or toxicity problems for drinking water supplies. Furthermore when there is no photosynthetic activity e.g., during the night, to renew oxygen supplies for the dense concentrations of living cells, dissolved oxygen levels are depleted and fish and other aquatic animals cannot survive.

Phosphorus occurs in water in many different forms e.g., dissolved, bioavailable, particulate, and total phosphorus. Measuring these different forms of phosphorus in water can be achieved by methods known in the art see e.g., Eghball, B., Pote, D. H. (2003) *Measurement of Phosphorus in Water Encyclopedia of Water Science:* 666-668.

Although a number of analytical tests exist for the measurement of phosphorus, the ascorbic acid method described in Standard Methods (AHPA 1989) is probably the most commonly used test.

C. Potassium

Soil potassium levels are measured by methods known in the art. In an exemplary embodiment, soil potassium is extracted with the appropriate extraxtant (see e.g., Methods of soil analysis Part 3. *Chemical Methods*, D. L. Sparks ed. 49-64. American Society of Agronomy, Madison, Wis.) The extracted sample is than filtered through a 0.45 micron filter (Whatman #1) and the potassium is measured on a inductively coupled plasma spectrometer or atomic absorption spectrometer.

V. Measurement of Pesticide Levels in Water Sources

Pesticide levels are measured by any method known in the art (see e.g., Thomas W. Moy and William C. Brumley (2003) *Chromatogr. Sci.* 47, 343-349; Battaglin, et al. (2000), The Science of the Total Environment, 248(2-3):123-133; E. A. Lee, et al., (2001) Methods of analysis by the U.S. Geological Survey Organic Geochemistry Research Group—U.S. Geological Survey, Open-File Report 01-10; Zimmerman, L. R., et al., (2000) Methods of Analysis by the U.S. Geological Survey Organic Geochemistry Research Group—Determination of Chloroacetanilide Herbicide Degradates in Water Using High-Performance Liquid Chromatography-Diode Array Detection and High-Performance Liquid Chromatography/Mass Spectrometry: U.S. Geological Survey Open File Report 00-182).

In exemplary embodiments, pesticide levels are made by measuring pesticide degradation products, as is known in the art (see e.g., Kolpin, D. W., et al., (1999), *Finding minimal herbicide concentrations in ground water? Try looking for the degradates* In Morganwalp, D. W., and Buxton, H. T., eds., U.S. Geological Survey Toxic Substances Hydrology Program-Proceedings of the Technical Meeting, Charleston, S. C., Mar. 8-12, 1999-Volume 2 of 3-Contamination of Hydrologic Systems and Related Ecosystems: U.S. Geological Survey Water-Resources Investigations Report 99-4018B:247-254; and Kolpin, D. W., et al., (1998), *Archives of Environmental Contamination and Toxicology* 35(3):385-390).

VI. Eutrophication

Eutrophication of water sources has numerous effects. For example, nutrient accumulation and the resulting eutrophication of water sources can over-stimulate growth of phytoplankton, creating conditions that are visibly unpleasant conditions and which also interfere with the health and diversity of indigenous plant and animal populations.

At high densities phytoplankton are extremely unpleasant e.g., the sight and smell of clots and/or masses of decaying phytoplankton decreases the recreational value of waters and can cause widespread illness. Indeed, blooms of phytoplankton contribute to a wide range of water-related problems, which include, but which are not limited to: summer fish kills, foul odors, and unpalatable tastes in drinking water. Phytoplankton blooms also cloud the water and block sunlight, causing native underwater flora to die. Since native flora provide food, shelter, spawning and nursery habitat for aquatic fauna, eutrophication has far reaching consequences.

In an exemplary embodiment, a "bloom" of phytoplankton occurs when the chlorophyll a concentration is at least about 30 μg/L. Typically, phytoplankton blooms occur when soluble nitrogen levels reach at least about 0.3 ppm and/or soluble inorganic phosphorous reaches about 0.01 ppm. The visual impact of these can be especially severe when surface algae is involved.

Since phytoplankton blooms have a noticeable visual impact e.g., blooms may decrease water clarity, in an exemplary embodiment, eutrophication is measured by its effect on phytoplaktonic growth and water clarity. A well known method for measuring water clarity employs a small black and white disk called a Secchi disk (see e.g., Carlson, R. E. and J. Simpson. 1996. *A Coordinator's Guide to Volunteer Lake Monitoring Methods.* North American Lake Management Society. 96 pp.). The water clarity, or Secchi disk transparency, is a measure of the depth one can see into a lake. This disk is dropped into the water and where it disappears from view is called the Secchi disk depth.

In oligotrophic lakes with low phytoplankton levels and no color or suspended sediments, the Secchi disk depth may be 30 feet or more. In contrast, in eutrophic lakes, where the phytoplankton is more dense, the Secchi disk may disappear very rapidly, perhaps at 5 feet or so. Up to certain levels, as the phytoplankton concentration continues to increase, the water clarity continues to drop. Indeed, in hypereurophc lakes, the Secchi disk may disappear in only a few inches of water.

Unfortunately, at a certain point (e.g., when the total chlorophyll measurement is at about chlorophyll 50 micrograms per liter) the water simply can't look any murkier, and therefore the water clarity will not change. Therefore, in another exemplary embodiment, eutrophication is measured by measuring the amount of chlorophyll present in the water.

Chlorophyll in leaves or water is typically measured by spectrophotometry. To measure chlorophyll in water, a water sample is collected, and filtered to concentrate the chlorophyll-containing organisms. The chlorophyll containing cells are mechanically ruptured, and the chlorophyll is extracted into organic solvent e.g., acetone. The extract is then analyzed by either a spectrophotometric method (absorbance or fluorescence), using the known optical properties of chlorophyll, or by HPLC. This general method, detailed e.g., in Section 10200 H. of *Standard Methods*, The fluorometric method also requires the same extraction methods used with spectrophotometry, then uses a fluorometer to measure discrete molecular chlorophyll fluorescence.

EXAMPLES

Example 1

The following example illustrates the effectiveness of some exemplary fertilizer formulations in an experimental column setting. The fertilizer formulations used comprise inorganic chemical fertilizer nutrients combined with starch, chitosan and lignin. The formulations are shown below in Table 1.

1.1 Experimental Fertilizer Formulation

Treatment #1: control; no fertilizer was applied to the columns (FIG. 1).

Treatment #2: was 5.0 g of the Osmocote® (14-14-14) slow release fertilizer (SRF) which was equal to 345 μg N and 344 μg P per column and 167.7 kg N ha$^{-1}$ and 166.9 kg N ha$^{-1}$ (Table 1).

Treatment #3: was MBF 1 which received 313 μg N and 164 μg P per column and was equal to 152 kg N ha$^{-1}$ and 80 kg P ha$^{-1}$.

Treatment #4: was MBF 2 which received 249 μg N and 181 μg P per column and was equal to 121 kg N ha$^{-1}$ and 88 kg P ha$^{-1}$.

Treatment #5: was MBF 3 which received 60 μg N and 294 μg P per column and was equal to 29 kg N ha$^{-1}$ and 143 kg P ha$^{-1}$.

Treatments #6, #7 and #8 were added to determine the effect of $Al(SO_4)_3H_2O$ and $Fe_2(SO_4)_3$ on N and P leaching in the columns.

Treatment #6: was MBF 3+Al–Fe which MBF 3 was placed over 0.488 g $Al(SO_4)_3H_2O$ without $Fe_2(SO_4)_3$. MBF 3+Al–Fe received 60 μg N and 294 μg P per column and was equal to 29 kg N ha$^{-1}$ and 143 kg P$^{-1}$.

Treatment #7: was MBF 3 –Al+Fe placed over 1.600 g $Fe_2(SO_4)_3$ without $Al(SO_4)_3H_2O$. MBF 3 –Al+Fe received 60 μg N and 294 μg P per column and was equal to 29 kg N ha$^{-1}$ and 143 kg P ha$^{-1}$.

Treatment #8: was MBF 3 –Al–Fe was MBF3 without $Al(SO_4)_3H_2O$ or $Fe_2(SO_4)_3$ which received 60 Φg N and 294 Φg P per column and was equal to 29 kg N ha$^{-1}$ and 143 kg P ha$^{-1}$. 8000 spores of *Glomus interadicies* were added in 1.00 ml of reverse osmosis water to all MBF treatments (per column) to increase plant nutrient uptake.

1.3 Soil Descriptions

Soils having three different textures were used to determine the effectiveness of the fertilizers to reduce leaching over a range of soil types. The Brown's Creek soil was a loam and was classified as a fine, montmorillonitic, mesic Xerollic Haplargid. The Simco soil was a coarse-loamy sand and classified as a mixed non-acid, mesic Xeric Torriorthents. The Kuna soil is a sandy loam and classified as a mixed, mesic lithic Xerollic Camborthids (Collett, 1982).

1.4 Experimental Design

The experiment was arranged in a completely randomized design (see e.g., Kirk, (1982) *Experimental design: Procedures for the behavioral sciences*. 2nd ed. Brooks Cole Publishing Co, Belmont, Calif. 592 pp.) with 8 fertilizer treatments×3 soil textures with 3 replications. There were a total of 72 columns and 360 leachate measurements. Plants were given 100 ml reverse osmosis each day for 16 weeks. Samples were measured for $NH_4$, $NO_3$, and Total Phosphate (TP) in leachate at 21, 42, 63, 84 and 112 days.

1.5 Fertilizer Placement and Growing Conditions

The above stated amounts of $Fe_2(SO_4)_3$ and/or $Al(SO_4)_3H_2O$ were placed at a depth of 5 cm in columns receiving MBF treatments 6, 7 and 8. The MBF formulations were placed directly above the $Fe_2(SO_4)_3$ and/or $Al(SO_4)_3H_2O$. The slow release Osmocote® 14-14-14 fertilizer not receiving additional $Fe_2(SO_4)_3$ and/or $Al(SO_4)_3H_2O$ was mixed into the top 5 cm of soil. 0.5 g of white soft spring wheat, (*Triticum aestivum* L.cv. Frame) seed was placed on top of each column. Seeds were covered with 0.5 cm of soil. Seeds were watered with 100 ml of water daily to maintain field capacity of the soil. Leachate did not flow through columns when 100 ml water was applied. Leachate was collected 21, 42, 63, 84 and 112 days after fertilizer placement (start of the experiment) by giving plants 500 ml reverse osmosis water on the above stated days in lieu of the 100 ml daily reverse osmosis water. On each sampling day approximately

TABLE 1

Chemical compounds in each of three different matrix based fertilizers. Amounts reported are in milligrams (mg) N and P.

| Compound | 1 CONT | 2 SRF | 3 MBF1 | 4 MBF2 | 5 MBF3 | 6 MBF3 +Al–Fe | 7 MBF3 –Al+Fe | 8 MBF3 –Al–Fe |
|---|---|---|---|---|---|---|---|---|
| $NH_4NO_3$ | 000 | 210 | 000 | 000 | 000 | 000 | 000 | 000 |
| $P_2O_5$ | 000 | 200 | 000 | 000 | 000 | 000 | 000 | 000 |
| $K_2O$ | 000 | 180 | 180 | 180 | 180 | 180 | 180 | 180 |
| $Ca(NO_3)_2 4H_2O$ | 000 | 000 | 472 | 236 | 236 | 236 | 236 | 236 |
| $Al(NO_3)_3 9H_2$ | 000 | 000 | 750 | 000 | 0000 | 000 | 000 | 000 |
| $NH_4(H_2PO_4)$ | 000 | 000 | 230 | 115 | 115 | 115 | 115 | 115 |
| $Ca(H_2PO_4)_2$ | 000 | 000 | 468 | 234 | 234 | 234 | 234 | 234 |
| $Fe(P_2O_7)$ | 000 | 000 | 334 | 1490 | 1490 | 1490 | 1490 | 1490 |
| $Al(PO_4)_3$ | 000 | 000 | 360 | 000 | 0.000 | 000 | 000 | 000 |
| $Al(SO_4)_3 H_2O$ | 000 | 000 | 488 | 366 | 366 | 488 | 000 | 000 |
| $Fe_2(SO_4)_3$ | 000 | 000 | 400 | 800 | 1600 | 000 | 1600 | 000 |
| Starch | 000 | 000 | 1000 | 1000 | 1000 | 1000 | 1000 | 1000 |
| Chitosan | 000 | 000 | 1000 | 1000 | 1000 | 1000 | 1000 | 1000 |
| Lignin | 000 | 000 | 1000 | 1000 | 1000 | 1000 | 1000 | 1000 |
| *G. intradices* | .000 | .000 | 10 | 10 | 0.010 | .010 | .010 | .010 |

1.2 Column Description

A 2.0 mm wire screen was cut into squares (125×125 mm) and secured to the bottom of each 10.0 cm diameter×30 cm long polyvinyl chloride cylinder (FIG. 1). A 14 cm diameter funnel was placed below each column in the rack and secured. Three kilograms of soil were placed in each column (columns were filled to 25 cm) leaving a 5 cm space at the top of each column. Soil in columns was loosely packed and then repeatedly washed with reverse osmosis water to flush nutrients that could be loosely held to soil particles. Columns were allowed to drain for 1 h prior to the start of leachate collection as described below.

200 ml leachate was collected from each column. Subsamples were analyzed for $NO_3^-$ and $NH_4^+$ and TP as described below. Throughout the experiment plants were exposed to light having a photosynthetic active radiation of 400-700 mmol m$^{-2}$ s$^{-1}$ and a 14-16 h photoperiod.

1.6 Chemical Analysis

Nitrate and $NH_4^+$ were determined using a Lachat Automated Ion Analyzer (Quickchem 8000 Systems, Milwaukee, Wis.) using the method as described by Greenberg et al., (1992, *Standard methods for the examination of water and wastewater*, 18th edition. American Public Health Association, Washington D.C. 20005).

Total P in leachate was determined by digesting 25 ml aliquots in an autoclave at 103.5 kPa and 121° C. for 60 min with 4.0 ml acidified ammonium persulfate (Greenberg et al., supra). At harvest, plant root and shoot material were weighed then ground to pass a 1 mm mesh. A 0.50 g subsample was analyzed for total N with a LECO CHN-600 nitrogen analyzer (St. Joseph, Mich.). A 0.25 g subsample was ashed at 500° C., dissolved in 25 ml of 1.0 M HCl, brought to 50 ml volume with reverse osmosis water and analyzed for P, K, Ca, Mg, Mn, Fe, Cu, B and Zn using a inductively coupled plasma emission spectrometer (Perkin-Elmer, Boston, Mass.).

1.7 Statistical Analysis

Nitrate, $NH_4^+$ and TP values were tested for normal distribution. Data were then analyzed using general linear models (GLM) procedures for a completely random design with Statistical Analysis Systems (SAS Institute Inc., 1996). In all analyses, residuals were equally distributed with constant variances. Differences reported throughout are significant at $p \leq 0.05$, as determined by the Least Squares Means test.

1.8 Results

Statistical comparisons of $NH_4^+$, $NO_3^-$ and total P are presented for fertilizer treatments because General Linear Models (GLM) models showed these interactions were significant at $p \leq 0.05$.

After 112 days, SRF leachate contained a greater amount of $NH_4^+$, $NO_3^-$ and Total Phosphate (TP) than leachate from all other fertilizers. In all three soils there were no consistent differences in the amount of $NH_4^+$, $NO_3^-$ and TP in the MBF leachates than in the control leachate.

Discussion 70-86% of the $NH_4^+$, 75-84% of the $NO_3^-$ and 84% of the total P was leached from the soil columns in the first 63 days after the Osmocote® (14-14-14) SRF was applied (data not shown). The MBF formulation reduced leaching of ammonium by approximately 80%, nitrate by approximately 50% and dissolved reactive phosphorus, total reactive phosphorus and total phosphorus by approximately 70% over 71 days.

The MBF formulations contained more N and P than the SRF fertilizers, but a significant amount of the nutrients were bound to the $Al(SO_4)_3H_2O$, or $Fe_2(SO_4)_3$, starch, chitosan and lignin exchange matrix and more slowly available to plants. The MBF formulations with SRF (Avail) result in increased plant (grass) biomass and reduced ammonium by approximately 80%, nitrate by approximately 50% and dissolved reactive phosphorus, total reactive phosphorus and total phosphorus by approximately 70% over 143 days. A small fraction of N and P was immobilized in the matrix and only available to plants over months or years. That amount is what is near optimum for plant growth and there is little excess that can be leached. Thus, without being bound by theory, it appears that the Matrix Based Formulation (MBF) nutrients remain bound on the matrix and become available as plants grow and require them.

The MBF formulations in our study include a range of common inorganic nutrient compounds combined with $Al(SO_4)_3H_2O$ and/or $Fe_2(SO_4)_3$ and the high ionic exchange compounds starch, chitosan and lignin. The matrix based formulations (MBF) include a range of inorganic N and P in compounds that are relatively loosely bound (MBF 1) to more moderately bound (MBF2) and more tightly compounds (MBF3) mixed with $Al(SO_4)_3H_2O$ and/or $Fe_2(SO_4)_3$ and with the high ionic exchange compounds starch, chitosan and lignin (cf. Table 1).

Conclusions

The MBF formulations provide a composition and method for providing fertilizers and pesticides to cultivated plants of all types while reducing runoff and leaching of the nutrients and pesticides. Use by homeowners, turf grass operators such as golf course managers and agriculturists in general provides healthy abundant crops, gardens, parks etc, while simultaneously reducing nutrient leaching and ultimately eutrophication.

Example 2

The following example illustrates the efficacy of the matrix based fertilizers to reduce $NH_4$, $NO_3$ dissolved reactive phosphorus (DRP), total reactive phosphorus (TRP) total phosphorus (TP), leaching with plants in washed sand.

The experiment was arranged in a completely randomized design with 8 fertilizer treatments×3 soil types×3 replications×4 leachate measurements. Thus, the experiment contained seven treatments and a control and three replications for a total of 72 columns. The treatments and control were as follows: Matrix based fertilizer 1; Matrix based fertilizer 2; Matrix based fertilizer 3; Matrix based fertilizer 3+$Al(SO4)_3H_2O$; Matrix based fertilizer 3+$Fe2(SO_4)_3$-$Al(SO_4)_3H_2O$; Matrix based fertilizer 2+$Al(SO_4)_3H_2O$; Slow release fertilizer (Osmocoate 14-14-14); control (no fertilizer).

White soft spring wheat, (*Triticum aestivum* L.) were planted in columns filled with a loam, sandy loam and a sandy soil. Columns were randomly arranged in the greenhouse. Plants were watered with 200 ml reverse osmosis water each day for 71 days. Leachate was collected as described below and measured at 1, 22, 43 and 71 days after planting.

Nitrate, $NH_4$, $NO_3$, total phosphorus (TP), total reactive phosphorus (TRP) and dissolved reactive phosphorus (DRP), in samples were measured in leachate at the above stated days.

A 2.00 mm wire screen was cut into squares (125×125 mm) and secured to the bottom of each 10.0 cm diameter×40 cm long polyvinyl chloride cylinder (FIGS. 1 and 2.). A 12 cm diameter funnel was placed below each column in the rack and secured. Three kg of sand was placed in each column (columns were filled to 25 cm) leaving a 5 cm space at the top of each column. Sand or soil in columns was loosely packed and then repeatedly washed with distilled water to flush nutrients that could be loosely held to sand particles. Columns were allowed to drain for 1 hr prior to the start of leachate collection.

After 72 days, plants were removed from the columns and separated into roots and shoots. Roots were washed in distilled deionized water until all visible soil particles were removed. All root and shoot tissue was then dried at 80° C. for 48 h and weighed for shoot and root biomass. Three roots were randomly selected from each plant, cut to 0.3 cm and cleared by placing them in a solution of 10% (w/v) KOH. The roots in the KOH solution were then placed in a autoclave for 2 hours. Roots were then placed in a solution of 0.05% (w/v) trypan blue in lactoglycerol for 24 hr.

Roots were observed under a 200× microscope by the cross hair intersection method and approximately 100 intersections were recorded to give a measure of % root area infected. Nitrate and ammonium were determined using a Lachat autoanalyzer. Total P was estimated using methods described by Olsen and Sommers (1982) Phosphorus. p. 403-430. In A. L. Page et al. (ed.) Methods of soil analysis. Part 2. 2nd ed. Agron. Monogr. 9. ASA and SSSA, Madison, Wis.

A 0.25 g subsample of plant root and shoot material were analyzed for total N with a LECO CHN-600 nitrogen analyzer. Data were tested for normal distribution and then analyzed using general linear models (GLM) procedures for a completely random design with SAS. In all analysis, residuals were equally distributed with constant variances. Differences reported throughout are significant at $p \leq 0.05$, as determined by the Least Squares Means test.

Results

After 70 days the total amount of nitrate, $NH_4$, $NO_3$, total phosphorus (TP), and total reactive phosphorus (TRP) were significantly less from the columns treated with matrix based formulations than for those columns not receiving a matrix based formulation. For example, the total amount of $NH_4^+$ leached from soil columns in 70 days was less than about 10 µg for the matrix based formulations as compared with more than about 250 µg for the column treated with slow release fertilizer (Osmocote®). Similarly, the total amount of total phosphorus (TP) leached from soil columns in 70 days was less than about 300 µg for all of the matrix based formulations as compared with more than about 800 µg for the column treated with slow release fertilizer (Osmocote®).

Example 3

The following example further illustrates the efficacy of the matrix based fertilizers to reduce $NH_4$, $NO_3$ dissolved reactive phosphorus (DRP), total reactive phosphorus (TRP) total phosphorus (TP), leaching with additional slow release fertilizers added.

The experiment was arranged in a completely randomized design with 9 fertilizer treatments×3 replications×7 leachate measurements. The experiment contained nine treatments and nine replications for a total of 81 columns. Columns were randomly arranged in the greenhouse.

Results

As above, the total amount of nitrate, $NH_4$, $NO_3$, total phosphorus (TP), and total reactive phosphorus (TRP) were significantly less from the columns treated with matrix based formulations than for those columns not receiving a matrix based formulation. For example, the concentration of $NH_4^+$ in reverse osmosis water leached from soil columns treated with MBF 1 or MBF3 and Avail® was less than about 1.5 µg/L for the matrix based formulations as compared with more than about 2 µg/L for the column treated with slow release fertilizer Avail® alone. Similarly, the concentration of total phosphorus (TP) in reverse osmosis water leached from soil columns was less than about 20 µg/L for the MBF 1 or MBF3 and Avail® as compared with more than about 60 µg/L for the column treated with slow release fertilizer Avail® alone.

What is claimed is:

1. A matrix based fertilizer formulation comprising:
  (i) at least one metal compound selected from the group consisting of aluminum compounds and ferric compounds or a combination of such members; and
  (ii) a high ionic exchange matrix comprising semi-soluable decomposable polymers that are members selected from the group consisting of chitosan, lignin, cellulose or starch,
  wherein
    the semi-soluable decomposable polymers comprise between about 30% to about 60% by weight of the matrix based fertilizer formulation, and
  wherein
    the high ionic exchange matrix comprises starch and at least two of chitosan, lignin or cellulose.

2. The matrix based fertilizer formulation of claim 1, wherein the aluminum compound is a member selected from the group consisting of hydrated aluminum sulfate, and aluminum hydroxide or a combination of such members; and the ferric compound is a member selected from the group consisting of ferric sulfate, and ferric citrate or a combination of such members.

3. The matrix based fertilizer formulation of claim 1, wherein the fertilizer formulation further comprises plant nutrients.

4. The matrix based fertilizer formulation of claim 3, wherein the plant nutrients are members selected from the group consisting of nitrogen, phosphorus, potassium calcium, magnesium, manganese, sulfur, iron, zinc, copper, molybdenum, boron, chlorine, silicon and cobalt, or a combination of such members.

5. A matrix based fertilizer formulation comprising plant nutrients, and: chitosan; lignin; starch; hydrated aluminum sulfate; and ferric sulfate wherein
  (1) the chitosan is present in an amount of about 20% weight/weight;
  (2) the lignin is present in an amount of about 20% weight/weight;
  (3) the starch is present in an amount of about 20% weight/weight; and
  (4) the hydrated aluminum sulfate is present in an amount between about 0.01% weight/weight to about 5.0% weight/weight; and
  (5) the ferric sulfate is present in an amount between about 4.0% weight/weight to about 15.5% weight/weight.

6. The matrix based fertilizer formulation of claim 5, wherein the formulation further comprises cellulose in an amount of about 20% weight/weight.

7. A method of applying a matrix based fertilizer formulation to minimize plant nutrient leaching into water sources, wherein the matrix based fertilizer formulation comprises: (i) at least one metal compound selected from the group consisting of aluminum compounds and ferric compounds or a combination of such members; and (ii) a high ionic exchange matrix comprising semi-soluable decomposable polymers that are members selected from the group consisting of chitosan, lignin, cellulose or starch, wherein the semi-soluable decomposable polymers comprise between about 30% to about 60% by weight of the matrix based fertilizer formulation, and wherein the high ionic exchange matrix comprises starch and at least two of chitosan, lignin or cellulose the method comprising:
  (a) separately applying the at least one metal compound to soil;
  (b) mixing the high ionic exchange matrix with plant nutrients thereby forming a mixture comprising plant nutrients and a high ionic exchange matrix; and
  (c) layering the mixture comprising plant nutrients and a high ionic exchange matrix from step (b) over the separately applied at least one metal compound from step (a), thereby applying a matrix based fertilizer formulation to minimize plant nutrient leaching into water sources.

8. A method applying a matrix based fertilizer formulation to minimize plant nutrient leaching into water sources, wherein the matrix based fertilizer formulation comprises: (i) at least one metal compound selected from the group consisting of aluminum compounds and ferric compounds or a combination of such members; and (ii) a high ionic exchange matrix comprising semi-soluable decomposable polymers that are members selected from the group consisting of chitosan, lignin, cellulose or starch, wherein the semi-soluable decomposable polymers comprise between about 30% to about 60% by weight of the matrix based fertilizer formulation, and wherein the high ionic exchange matrix comprises starch and at least two of chitosan, lignin or cellulose the method comprising:
  (a) mixing the at least one metal compound with the high ionic exchange matrix and plant nutrients, and thereby forming a mixture comprising plant nutrients, the at least one metal compound and the high ionic exchange matrix; and
  (b) applying the mixture to soil,
  thereby applying a matrix based fertilizer formulation to minimize plant nutrient leaching into water sources.

* * * * *